(12) United States Patent
Forstall et al.

(10) Patent No.: US 7,707,514 B2
(45) Date of Patent: Apr. 27, 2010

(54) MANAGEMENT OF USER INTERFACE ELEMENTS IN A DISPLAY ENVIRONMENT

(75) Inventors: Scott Forstall, Mountain View, CA (US); Imran A. Chaudhri, San Francisco, CA (US); John O. Louch, San Luis Obispo, CA (US); Eric Steven Peyton, Lisle, IL (US)

(73) Assignee: Apple Inc., Cupertino, CA (US)

( * ) Notice: Subject to any disclaimer, the term of this patent is extended or adjusted under 35 U.S.C. 154(b) by 387 days.

(21) Appl. No.: 11/429,492

(22) Filed: May 5, 2006

(65) Prior Publication Data

US 2007/0118813 A1 May 24, 2007

Related U.S. Application Data

(60) Provisional application No. 60/737,899, filed on Nov. 18, 2005.

(51) Int. Cl.
*G06F 3/00* (2006.01)
*G06F 3/048* (2006.01)

(52) U.S. Cl. .................. 715/810; 715/741; 715/811

(58) Field of Classification Search .............. 715/714, 715/763, 764, 802, 731, 736, 741–745, 789, 715/809–811, 859
See application file for complete search history.

(56) References Cited

U.S. PATENT DOCUMENTS

| 4,752,893 | A | 6/1988 | Guttag et al. |
|---|---|---|---|
| 5,168,441 | A | 12/1992 | Ornaheim et al. |
| 5,289,574 | A | 2/1994 | Sawyer |
| 5,297,250 | A | 3/1994 | Leroy et al. |
| 5,351,995 | A | 10/1994 | Booker |
| 5,357,603 | A | 10/1994 | Parker |
| 5,388,201 | A | 2/1995 | Hourvitz et al. |
| 5,416,890 | A | 5/1995 | Beretta |
| 5,481,665 | A | 1/1996 | Okada et al. |
| 5,490,246 | A | 2/1996 | Brotsky et al. |
| 5,522,022 | A | 5/1996 | Rao et al. |
| 5,537,630 | A | 7/1996 | Berry et al. |
| 5,564,022 | A | 10/1996 | Brown |
| 5,588,098 | A | 12/1996 | Chen et al. |
| 5,602,997 | A | 2/1997 | Carpenter et al. |

(Continued)

FOREIGN PATENT DOCUMENTS

DE 102 42 378 3/2004

(Continued)

OTHER PUBLICATIONS

"Writing a Desk Accessory," Developer Connection, Apple Computer, Inc. Jul. 3, 1996, [online] [Retrieved on Jan. 3, 2006] Retrieved from the Internet URL: http://developer.apple.com/documentation/mac/devices/devices-16.html>, 3 pages.

(Continued)

*Primary Examiner*—Weilun Lo
*Assistant Examiner*—Truc T Chuong
(74) *Attorney, Agent, or Firm*—Fish & Richardson P.C.

(57) ABSTRACT

A widget manager facilitates management of widgets in a dashboard layer. Management functions can include enablement, preview, importation, exportation, organization, installation, deletion, acquisition, etc.

14 Claims, 28 Drawing Sheets

U.S. PATENT DOCUMENTS

| | | | |
|---|---|---|---|
| 5,638,501 A | 6/1997 | Gough et al. | |
| 5,644,737 A * | 7/1997 | Tuniman et al. | 715/810 |
| 5,644,739 A | 7/1997 | Moursund | |
| 5,651,107 A | 7/1997 | Frank et al. | |
| 5,657,049 A | 8/1997 | Ludolph et al. | |
| 5,659,693 A | 8/1997 | Hansen et al. | |
| 5,659,694 A | 8/1997 | Bibayan | |
| 5,671,343 A | 9/1997 | Kondo et al. | |
| 5,689,664 A | 11/1997 | Narayanan et al. | |
| 5,708,764 A | 1/1998 | Borrel et al. | |
| 5,721,848 A | 2/1998 | Joseph | |
| 5,727,135 A * | 3/1998 | Webb et al. | 358/1.14 |
| 5,731,819 A | 3/1998 | Gagne et al. | |
| 5,742,285 A | 4/1998 | Ueda | |
| 5,754,174 A | 5/1998 | Carpenter et al. | |
| 5,760,773 A | 6/1998 | Berman et al. | |
| 5,764,229 A | 6/1998 | Bennett | |
| 5,764,238 A | 6/1998 | Lum et al. | |
| 5,790,120 A | 8/1998 | Lozares et al. | |
| 5,793,376 A | 8/1998 | Tanaka et al. | |
| 5,796,402 A | 8/1998 | Ellison-Taylor | |
| 5,801,703 A | 9/1998 | Bowden et al. | |
| 5,809,230 A | 9/1998 | Pereira | |
| 5,835,692 A | 11/1998 | Cragun et al. | |
| 5,835,693 A | 11/1998 | Lynch et al. | |
| 5,838,316 A | 11/1998 | Arruza | |
| 5,870,734 A | 2/1999 | Kao | |
| 5,877,741 A | 3/1999 | Chee et al. | |
| 5,877,762 A | 3/1999 | Young et al. | |
| 5,878,219 A | 3/1999 | Vance, Jr. et al. | |
| 5,883,639 A | 3/1999 | Walton et al. | |
| 5,900,876 A | 5/1999 | Yagita et al. | |
| 5,903,896 A | 5/1999 | Waldman et al. | |
| 5,920,659 A | 7/1999 | Iverson et al. | |
| 5,929,852 A | 7/1999 | Fisher et al. | |
| 5,933,148 A | 8/1999 | Oka et al. | |
| 5,949,409 A | 9/1999 | Tanaka et al. | |
| 5,963,191 A | 10/1999 | Jaaskelainen, Jr. | |
| 5,978,579 A | 11/1999 | Buxton et al. | |
| 5,999,948 A | 12/1999 | Nelson et al. | |
| 6,005,568 A | 12/1999 | Simonoff et al. | |
| 6,006,231 A | 12/1999 | Popa | |
| 6,011,562 A | 1/2000 | Gagne et al. | |
| 6,031,937 A | 2/2000 | Graffagnino | |
| 6,045,446 A | 4/2000 | Ohshima | |
| 6,075,543 A | 6/2000 | Akeley | |
| 6,128,010 A | 10/2000 | Baxter et al. | |
| 6,133,915 A * | 10/2000 | Arcuri et al. | 715/779 |
| 6,144,381 A | 11/2000 | Lection et al. | |
| 6,154,601 A | 11/2000 | Yaegashi et al. | |
| 6,166,748 A | 12/2000 | Van Hook et al. | |
| 6,167,533 A | 12/2000 | Potterveld et al. | |
| 6,188,399 B1 | 2/2001 | Voas et al. | |
| 6,191,797 B1 | 2/2001 | Politis | |
| 6,195,664 B1 | 2/2001 | Tolfa | |
| 6,211,890 B1 | 4/2001 | Ohba | |
| 6,246,418 B1 | 6/2001 | Oka | |
| 6,259,432 B1 | 7/2001 | Yamada et al. | |
| 6,266,053 B1 | 7/2001 | French et al. | |
| 6,266,430 B1 | 7/2001 | Rhoads | |
| 6,272,484 B1 | 8/2001 | Martin et al. | |
| 6,272,558 B1 | 8/2001 | Hui et al. | |
| 6,275,831 B1 | 8/2001 | Bodnar et al. | |
| 6,278,448 B1 | 8/2001 | Brown et al. | |
| 6,278,450 B1 | 8/2001 | Arcuri et al. | |
| 6,300,947 B1 | 10/2001 | Kanevsky | |
| 6,304,684 B1 | 10/2001 | Niczyporuk et al. | |
| 6,307,574 B1 | 10/2001 | Ashe et al. | |
| 6,310,621 B1 | 10/2001 | Gagne et al. | |
| 6,313,851 B1 | 11/2001 | Matthews, III et al. | |
| 6,321,314 B1 | 11/2001 | Van Dyke | |
| 6,333,753 B1 | 12/2001 | Hinckley | |
| 6,344,855 B1 | 2/2002 | Fisher et al. | |
| 6,353,437 B1 | 3/2002 | Gagne | |
| 6,369,823 B2 | 4/2002 | Ohba | |
| 6,369,830 B1 | 4/2002 | Brunner et al. | |
| 6,396,520 B1 | 5/2002 | Ording | |
| 6,401,104 B1 | 6/2002 | LeRue et al. | |
| 6,411,301 B1 | 6/2002 | Parikh et al. | |
| 6,412,021 B1 | 6/2002 | Nguyen et al. | |
| 6,421,058 B2 | 7/2002 | Parikh et al. | |
| 6,424,348 B2 | 7/2002 | Parikh | |
| 6,434,744 B1 | 8/2002 | Chamberlain et al. | |
| 6,452,600 B1 | 9/2002 | Parikh et al. | |
| 6,456,290 B2 | 9/2002 | Parikh et al. | |
| 6,457,034 B1 | 9/2002 | Morein | |
| 6,466,218 B2 | 10/2002 | Parikh et al. | |
| 6,469,714 B2 | 10/2002 | Buxton et al. | |
| 6,483,524 B1 | 11/2002 | Petchenkine et al. | |
| 6,484,261 B1 * | 11/2002 | Wiegel | 715/763 |
| 6,487,560 B1 | 11/2002 | LaRue et al. | |
| 6,489,963 B2 | 12/2002 | Parikh et al. | |
| 6,512,522 B1 | 1/2003 | Miller et al. | |
| 6,515,682 B1 | 2/2003 | Washington et al. | |
| 6,525,736 B1 | 2/2003 | Erikawa et al. | |
| 6,526,174 B1 | 2/2003 | Graffagnino | |
| 6,535,892 B1 | 3/2003 | LaRue et al. | |
| 6,542,160 B1 | 4/2003 | Abgrall | |
| 6,542,166 B1 | 4/2003 | Washington et al. | |
| 6,544,295 B1 | 4/2003 | Bodnar | |
| 6,571,328 B2 | 5/2003 | Liao et al. | |
| 6,573,896 B1 | 6/2003 | Ribadeau et al. | |
| 6,577,317 B1 | 6/2003 | Duluk, Jr. et al. | |
| 6,580,430 B1 | 6/2003 | Hollis et al. | |
| 6,590,592 B1 | 7/2003 | Nason et al. | |
| 6,609,977 B1 | 8/2003 | Shimizu et al. | |
| 6,614,444 B1 | 9/2003 | Duluk, Jr. et al. | |
| 6,618,048 B1 | 9/2003 | Leather | |
| 6,636,214 B1 | 10/2003 | Leather et al. | |
| 6,639,595 B1 | 10/2003 | Drebin et al. | |
| 6,661,426 B1 | 12/2003 | Jetha et al. | |
| 6,664,958 B1 | 12/2003 | Leather et al. | |
| 6,664,962 B1 | 12/2003 | Komstheoft et al. | |
| 6,664,986 B1 | 12/2003 | Kopelman et al. | |
| 6,674,438 B1 | 1/2004 | Yamamoto et al. | |
| 6,697,074 B2 | 2/2004 | Parikh et al. | |
| 6,707,462 B1 | 3/2004 | Peercy et al. | |
| 6,714,201 B1 | 3/2004 | Grinstein et al. | |
| 6,715,053 B1 | 3/2004 | Grigor | |
| 6,717,599 B1 | 4/2004 | Olano | |
| 6,724,403 B1 | 4/2004 | Santoro et al. | |
| 6,734,864 B2 | 5/2004 | Abgrall | |
| 6,738,804 B1 | 5/2004 | Lo | |
| 6,741,242 B1 | 5/2004 | Itoh et al. | |
| 6,760,046 B2 | 7/2004 | I'Anson et al. | |
| 6,765,592 B1 | 7/2004 | Pletcher et al. | |
| 6,788,318 B2 | 9/2004 | Chen | |
| 6,806,892 B1 | 10/2004 | Plow et al. | |
| 6,882,979 B1 | 4/2005 | Reay et al. | |
| 6,892,360 B1 | 5/2005 | Pabla et al. | |
| 6,906,720 B2 | 6/2005 | Emberling et al. | |
| 6,910,000 B1 | 6/2005 | Yedidia et al. | |
| 6,911,984 B2 | 6/2005 | Sabella et al. | |
| 6,918,091 B2 | 7/2005 | Leavitt et al. | |
| 6,931,633 B1 | 8/2005 | Vazquez et al. | |
| 6,944,829 B2 | 9/2005 | Dando | |
| 6,993,721 B2 | 1/2006 | Rosin et al. | |
| 7,016,011 B2 | 3/2006 | De Haan | |
| 7,027,055 B2 | 4/2006 | Anderson et al. | |
| 7,050,955 B1 | 5/2006 | Carmel et al. | |
| 2001/0030647 A1 | 10/2001 | Sowizral et al. | |
| 2001/0035885 A1 | 11/2001 | Iron et al. | |
| 2002/0054148 A1 | 5/2002 | Okada | |
| 2002/0065946 A1 | 5/2002 | Narayan | |

| | | |
|---|---|---|
| 2002/0067418 A1 | 6/2002 | Hiroaki |
| 2002/0078453 A1 | 6/2002 | Kuo |
| 2002/0085037 A1 | 7/2002 | Leavitt et al. |
| 2002/0089526 A1 | 7/2002 | Buxton et al. |
| 2002/0093516 A1 | 7/2002 | Brunner et al. |
| 2002/0099678 A1 | 7/2002 | Albright et al. |
| 2002/0105548 A1 | 8/2002 | Hayton et al. |
| 2002/0112180 A1 | 8/2002 | Land et al. |
| 2002/0118217 A1 | 8/2002 | Fujiki |
| 2002/0120673 A1 | 8/2002 | Tolson et al. |
| 2002/0123739 A1 | 9/2002 | Graffagnino |
| 2002/0129092 A1 | 9/2002 | Tolson et al. |
| 2002/0133508 A1 | 9/2002 | LaRue et al. |
| 2002/0140740 A1 | 10/2002 | Chen |
| 2002/0158902 A1* | 10/2002 | Hooker et al. ............... 345/744 |
| 2002/0171682 A1 | 11/2002 | Frank et al. |
| 2002/0174003 A1 | 11/2002 | Redmann et al. |
| 2002/0174181 A1 | 11/2002 | Wei |
| 2002/0180798 A1 | 12/2002 | Poor et al. |
| 2002/0186257 A1 | 12/2002 | Cadiz et al. |
| 2002/0196268 A1 | 12/2002 | Wolff et al. |
| 2003/0008711 A1 | 1/2003 | Corbo |
| 2003/0009267 A1 | 1/2003 | Dunsky et al. |
| 2003/0018971 A1 | 1/2003 | McKenna, Jr. |
| 2003/0020671 A1 | 1/2003 | Santoro et al. |
| 2003/0046316 A1 | 3/2003 | Gergic et al. |
| 2003/0061482 A1 | 3/2003 | Emmerichs |
| 2003/0067489 A1 | 4/2003 | Wong et al. |
| 2003/0076369 A1 | 4/2003 | Resner et al. |
| 2003/0080995 A1 | 5/2003 | Tenenbaum et al. |
| 2003/0097659 A1 | 5/2003 | Goldman |
| 2003/0101046 A1 | 5/2003 | Krasnov |
| 2003/0122787 A1 | 7/2003 | Zimmerman et al. |
| 2003/0123739 A1 | 7/2003 | Graffagnino |
| 2003/0146934 A1 | 8/2003 | Bailey et al. |
| 2003/0154239 A1 | 8/2003 | Davis et al. |
| 2003/0158975 A1 | 8/2003 | Frank et al. |
| 2003/0164862 A1 | 9/2003 | Cadiz et al. |
| 2003/0169306 A1 | 9/2003 | Makipaa et al. |
| 2003/0174136 A1 | 9/2003 | Emberling et al. |
| 2003/0174154 A1 | 9/2003 | Yukie et al. |
| 2003/0184552 A1 | 10/2003 | Chadha |
| 2003/0184584 A1 | 10/2003 | Vachuska et al. |
| 2003/0189597 A1 | 10/2003 | Anderson et al. |
| 2003/0191799 A1 | 10/2003 | Araujo et al. |
| 2003/0208685 A1 | 11/2003 | Abdel-Rahman |
| 2004/0012626 A1 | 1/2004 | Brookins |
| 2004/0032409 A1 | 2/2004 | Girard |
| 2004/0036711 A1 | 2/2004 | Anderson |
| 2004/0039934 A1 | 2/2004 | Land et al. |
| 2004/0070629 A1 | 4/2004 | Seifert |
| 2004/0125128 A1 | 7/2004 | Chang et al. |
| 2004/0179019 A1 | 9/2004 | Sabella et al. |
| 2004/0194020 A1 | 9/2004 | Beda et al. |
| 2004/0205504 A1 | 10/2004 | Phillips |
| 2004/0212640 A1 | 10/2004 | Mann et al. |
| 2004/0215740 A1 | 10/2004 | Frank et al. |
| 2004/0223003 A1 | 11/2004 | Heirich et al. |
| 2004/0225955 A1 | 11/2004 | Ly |
| 2004/0255253 A1 | 12/2004 | Marcjan |
| 2004/0261012 A1 | 12/2004 | Balsiger |
| 2004/0261037 A1 | 12/2004 | Ording et al. |
| 2004/0261038 A1 | 12/2004 | Ording et al. |
| 2005/0010419 A1 | 1/2005 | Pourhamid |
| 2005/0010634 A1 | 1/2005 | Henderson et al. |
| 2005/0021935 A1 | 1/2005 | Schillings et al. |
| 2005/0022139 A1 | 1/2005 | Gettman et al. |
| 2005/0039144 A1 | 2/2005 | Wada et al. |
| 2005/0057497 A1 | 3/2005 | Kawahara |
| 2005/0060655 A1 | 3/2005 | Gray et al. |
| 2005/0060661 A1 | 3/2005 | Kawahara et al. |
| 2005/0088447 A1 | 4/2005 | Hanggie et al. |
| 2005/0088452 A1 | 4/2005 | Hanggie et al. |
| 2005/0091571 A1 | 4/2005 | Leichtling |
| 2005/0114021 A1 | 5/2005 | Krull et al. |
| 2005/0144563 A1 | 6/2005 | Hough et al. |
| 2005/0144595 A1 | 6/2005 | McLean |
| 2005/0160368 A1 | 7/2005 | Liu et al. |
| 2005/0168471 A1 | 8/2005 | Paquette |
| 2005/0168476 A1 | 8/2005 | Levene et al. |
| 2005/0172239 A1 | 8/2005 | Liu et al. |
| 2005/0183026 A1 | 8/2005 | Amano et al. |
| 2005/0193368 A1 | 9/2005 | Becker et al. |
| 2005/0198584 A1 | 9/2005 | Matthews et al. |
| 2005/0215310 A1 | 9/2005 | Boyd et al. |
| 2005/0240857 A1 | 10/2005 | Benedict et al. |
| 2005/0243373 A1 | 11/2005 | Silverbrook et al. |
| 2005/0256940 A1 | 11/2005 | Henderson et al. |
| 2005/0278651 A1 | 12/2005 | Coe et al. |
| 2005/0282612 A1 | 12/2005 | Matthews |
| 2005/0283734 A1 | 12/2005 | Santoro et al. |
| 2006/0015818 A1 | 1/2006 | Chaudhri et al. |
| 2006/0075106 A1 | 4/2006 | Hochmuth et al. |
| 2006/0075141 A1 | 4/2006 | Boxenhorn |
| 2006/0089840 A1 | 4/2006 | May |
| 2006/0123356 A1 | 6/2006 | Sobeski et al. |
| 2006/0218499 A1 | 9/2006 | Matthew et al. |
| 2006/0277469 A1 | 12/2006 | Chaudhri et al. |
| 2007/0038934 A1 | 2/2007 | Fellman |
| 2007/0044029 A1 | 2/2007 | Fisher et al. |
| 2007/0044039 A1 | 2/2007 | Amadio et al. |
| 2007/0061724 A1 | 3/2007 | Slothouber et al. |
| 2007/0101146 A1 | 5/2007 | Louch et al. |
| 2007/0101279 A1 | 5/2007 | Chaudhri et al. |
| 2007/0101288 A1 | 5/2007 | Forstall et al. |
| 2007/0101291 A1 | 5/2007 | Forstall |
| 2007/0101297 A1 | 5/2007 | Forstall et al. |
| 2007/0101433 A1 | 5/2007 | Forstall |
| 2007/0130541 A1 | 6/2007 | Louch et al. |
| 2007/0162850 A1 | 7/2007 | Adler et al. |
| 2007/0203984 A2 | 8/2007 | AlHusseini et al. |
| 2007/0209013 A1 | 9/2007 | Ramsey et al. |
| 2007/0266093 A1 | 11/2007 | Forstall et al. |
| 2008/0034309 A1 | 2/2008 | Louch et al. |
| 2008/0034314 A1 | 2/2008 | Louch et al. |
| 2008/0168367 A1 | 7/2008 | Chaudhri et al. |
| 2008/0168368 A1 | 7/2008 | Louch et al. |
| 2008/0168382 A1 | 7/2008 | Louch et al. |
| 2009/0005071 A1 | 1/2009 | Forstall et al. |
| 2009/0021486 A1 | 1/2009 | Chaudhri et al. |
| 2009/0024944 A1 | 1/2009 | Louch et al. |
| 2009/0044138 A1 | 2/2009 | Rudolph et al. |
| 2009/0228824 A1 | 9/2009 | Forstall et al. |

FOREIGN PATENT DOCUMENTS

| | | |
|---|---|---|
| EP | 548586 | 6/1993 |
| EP | 0694879 | 1/1996 |
| EP | 0 908 835 | 4/1999 |
| EP | 1 237 076 | 9/2002 |
| EP | 1383080 | 1/2004 |
| EP | 0972273 | 3/2004 |
| WO | WO 96/06401 | 2/1996 |
| WO | WO 97/07467 | 2/1997 |
| WO | WO 98/07112 | 2/1998 |
| WO | WO 98/45815 | 10/1998 |
| WO | WO 02/09039 | 1/2002 |
| WO | WO 03/023593 | 3/2003 |
| WO | WO 2004/027707 | 4/2004 |
| WO | WO 2004/076977 | 9/2004 |

OTHER PUBLICATIONS

Akeley, Kurt, and Hanrahan, Pat, "Real-Time Graphics Architecture," http://www.grahics.stanford.edu/courses/cs448a-01-fall, the OpenGL Graphics System, CS448 Lecture 15, Fall, 2001, pp. 1-20.

Altman, R.B., "Visual Quickstart Guide Power Point 2000/98, Applying Preset Animations," ProQuest Safari Books, Peachpit Press, May 7, 1999, 7 pages [online] Retrieved from the Internet: <URL: http://proquest.safaribooksonline.com/0201354411>.

Archive of "Objects, Images and Applets," W3C Recommendation, Feb. 10, 2003, [online] [Archived by http://archivve.org; Retrieved on Apr. 13, 2006] Retrieved from the Internet URL:http://web.archivve.org/web/20030210154019/http://www.w3.org/TR/REC-html140/struct/objects.html, 21 pages.

Cadiz, JJ et al., "Slideshow: Providing Peripheral Awareness of Important Information," Technical Report MSR-TR-2001-83, (Sep. 14, 2001), 9 pages. Microsoft Corporation, Redmond, WA.

Conner Borookshire D. et al. "Three-Dimensional Widgets" ACM 1992, 8 pages.

Elliott, Conal, "Programming Graphics Processors Functionally," Proceedings of the 2004 Haskell Workshop, Sep. 22, 2004. 11 pages.

Fried, Ina, "Developer Calls Apple's Tiger a Copycat," CNET News.com, Jun. 28, 2004 [online] Retrieved on Jul. 1, 2004 Retrieved from the Internet URL:http://zdnet.com.com/2102-1104_2-250692.html?tag=printthis, 2 pages.

Fried, Ina, "For Apple's Tiger, the Keyword is Search", CNET News.com, Jun. 28, 2004 [online] Retrieved on Jul. 1, 2004 Retrieved from the Internet URL:http://zdnet.com.com/2102-1103_2-5250346.html?tag=printthis, 2 pages.

Guber, John et al., "Dashboard vs. Konfabulator", Jun. 2004, 9 pages.

Haeberli, P. et al., "The Accumulation Buffer: Hardware Support for High-Quality Rendering," Computer Graphics, Aug. 1990, pp. 309-318, vol. 24, No. 4.

Http://en.wikipedia.org/wiki/Comparison_of_widget_engines, 2007, 6 pages.

http://en.wikipedia.org/wiki/Windows-Sidebar, 2007, 7 pages.

http://www.nat.org/dashboard/blog.php3_Dec. 2003, 31 pages.

International Search Report, PCT/US2005/008804, Jul. 27, 2005, 3 pages.

International Search Report and Writen Opinion, PCT/US2005/022152, Jul. 10, 2006, 8 pages.

International Search report, PCT/US2005/008805, Aug. 8, 2005, 3 pages.

Konfabulator, "Cupertino, Start your Photocopiers!," [online] [Retrieved on Jul. 1, 2004] Retrieved from the Internet <URL: http://www.konfabulator.com>, 1 page.

Konfabulator, "Konfabulator & Widget Basics," [online] [Retrieved on Jul. 1, 2004] Retrieved from the Internet <URL: http://www.konfabulator.com/info/basics.html>, 3 pages.

Konfabulator, "Screenshots," [online] [Retrieved on Jul. 1, 2004] Retrieved from the Internet <URL: http://www.konfabulator.com/info/screenshots.html>, 2 pages.

Konfabulator, "What is Konfabulator?," [online] [Retrieved on Jul. 1, 2004] Retrieved from the Internet <URL: http://www.konfabulator.com/info/, 3 pages.

Lammers, J.., et al., "Maya 4.5 Fundamentals: Particles, "New Riders Publishing, Jan. 14, 2003, 12 pages, [online] [retrieved on Feb. 17, 2007] Retrieved from ProQuest Safari Books Online on the Internet: <URL: http://proquest.safaribooksonline.com/0735713278>, 12 pages.

Notification of Transmittal of the International Search Report and the Written Opinion of the International Searching Authority, PCT/US2005/022579, 15 pages.

Nvidia, "CG—Teaching Cg," Power Point Presentation, Author and date unknown, pp. 1-16.

Puder, A., "Extending Desktop Applications to the Web," ACM International Conference Proceedings Series, Proceedings of the Jun. 2004 International Symposium on Information and Communication Technologies, 2004, vol. 90, 6 pages.

Rochkind, M. et al., "Common Elements in Today's Graphical User Interfaces: The Good, the Bad, and the Ugly," Interchi '93, AMC, Apr. 24-29, 1993, pp. 470-473.

Segal, Mark and Akeley, Kurt, "The OpenGL Graphics System: A Specification (Version 1.5)," Copyright 1992-2003 Silicon Graphics, Inc., Oct. 30, 2003, 334 pages.

Shantzis, Michael A., "A Model for Efficient and Flexible Image Computing," Computer Graphics Proceedings, Annual Conference Series, Orlando, Florida, Jul. 24-29, 1994, pp. 147-154.

Shiozawa, Hidekazu et al., "Perspective Layered Visualization of Collaborative Workspaces," Proceedings of the International ACM SIGGROUP conference on Supporting Group Work Publisher, Nov. 1999, 5 pages.

Snippet Software Inc. et al. "Corporate PortaL Newsletter" Oct. 2000, 3 pages.

Snippet Software Inc. et al. "Snippets Software" Jun. 2001, 16 pages.

Staples, Loretta, "Representation in Virtual Space: Visual Convention in the Graphical User Interface," Proceedings of the SIGCHI Conference on Human Factors in Computing Systems, Apr. 1993. http://www.nat.org/dashboard/blog.php3_Dec. 2003, 8 pages.

Stardock.com et al. "DesktopX Whitepaper and users Guide" 1999, 72 pages.

Tang, J.C. et al., "ConNexus to Awarenex: Extending Awareness to Mobile Users," SIGCHI '01, AMC, Mar. 31-Apr. 4, 2001, 8 pages.

Ullenboom, C., "Java is auch eine Insel," 2003, [online] [Retrieved on Apr. 13, 2006] Retrieved from the Internet URL: http://www.galileocomputing.de/openbook/javainsel2//java_140000.htm#Xxx998138, 3 pages.

Van Gelder, Allen, and Kwansik, Kim, "Direct Volume Rendering with Shading via Three-Dimensional Textures," Computer Science Dept., Univ. of California, Santa Cruz, CA 95064, 9 pages.

Wardell, Brad, Konfabulator for Windows, Jan. 10, 2004; [online] Retrieved from the Internet Mar. 6, 2006 Retrieved from the Internet: URL: http://www.xpthemes.com/forums.asp?MID=19&CMID=19&AID=4472, 6 pages.

"Desktop Sidebar", [online] [Retrieved on May 11, 2007] Retrieved from the Internet URL: http://web.archive.org/web/20040101160831/http://www.desktopsidebar.com/; 5 pages.

"Portlet Communication: What is application scope, anyway?", Sep. 18, 2002, [online]; Retrieved from the Internet at URL: http://wwwcoderanch.com/t/203244/Portals-Portlets/java/Portlet-Communication-What-application-scope; 3 pages.

"Starfish Software Introduces Starfish Internet Sidekick; Starfish Internet Sidekick is the best way for Internet users to manage their calendar, contacts and communications," Business Wire, Sep. 23, 1996, [online] [Retrieved on Dec. 8, 2008]; Retrieved from the Internet URL: http://findarticles.com/articles/mi_mOEIN/is_1996_Sept_23/ai_18704672?tag=rel.resl; 2 pages.

"Welcome to the Gigaplex!™", Lazar Productions, Nov. 1996, [online] [Retrieved on Dec. 8, 2008]; Retrieved from the Internet URL: http://web.archive.org/web/19961105081827/www.gigaplex.com/; 4 pages.

Akeley et al., "Real-Time Graphics Architecture," http://www.grahics.stanford.edu/courses/cs448a01-fall, the OpenGL® Graphics System, CS448 Lecture 15, Fall, 2001, pp. 1-20.

Akeley, "Cg— Teaching Cg," Power Point Presentation, NVIDIA Corporation, 2002; 1 page.

Altman, "Visual QuickStart Guide PowerPoint 2000/98, Applying Preset Animations", ProQuest Safari Books, Peachpit Press, May 7, 1999, [online] Retrieved from the Internet: URL: http://proquest.safaribooksonline.com/0201354411; 7 pages.

BabelFish.com, Inc., Oct. 2003, [online] [Retrieved on Dec. 8, 2008]; Retrieved from the Internet URL: http://web.archive.org/web/20031002115902/www.babelfish.com/en/index.html; 1 page.

Beier et al., "The Bull's-Eye: A Framework for Web Application User Interface Design Guidelines", Proceedings of the Sigchi Conference on Human Factors in Computing Systems, Apr. 2003, pp. 489-496.

Cadiz et al., "Slideshow: Providing Peripheral Awareness of Important Information," Technical Report MSR-TR-2001-83, Microsoft Corporation, Redmond, WA; Sep. 14, 2001; 9 pages.

Carey et al., "Integrating Widget Design Knowledge with User Interface Toolkits", Proceedings of the Fifth International Workshop on Computer-Aided Software Engineering, Jul. 1992, pp. 204-212.

Chen et al., "The Model of Optimum Route Selection in Vehicle Automatic Navigation System Based on Unblocked Reliability Analyses", Intelligent Transportation Systems, 2003, Proceedings, IEEE (2003), vol. 2, 12-15, Oct. 2003, pp. 975-978.

Chinese Notification of First Office Action, Chinese Patent Application No. 200580016349.3, Jul. 25, 2008, 21 pages.

Conner et al. "Three-Dimensional Widgets" ACM 1992, pp. 183-188 and 230-231.

Fried, Ina, "For Apple's Tiger, the kyword is search", CNET News.com, Jun. 28, 2004, [online] [Retrieved on May 5, 2009], Retrieved from the Internet URL: http://archive.org/web20040823135016/ http://zdnet.com-com/2102-1103_2-5250346.html; 2 pages.

Gruber et al., "Dashboard vs. Konfabulator", Jun. 2004; 10 pages.

Haeberli et al., "The Accumulation Buffer: Hardware Support for High-Quality Rendering," Computer Graphics, Aug. 1990, 24(4):309-318.

Helal et al., "Drishti: An Integrated Navigation System for Visually Impaired and Disabled", Fifth International Symposium on Wearable Computers (ISWC'01), IEEE, 2001, pp. 149-156.

International Search Report and the Written Opinion, dated Jan. 27, 2006, issued in International Application No. PCT/US2005/022579; 15 pages.

International Search Report and the Written Opinion, dated May 8, 2008, issued in International Application PCT/US2007/077441; 17 pages.

International Search Report, dated Aug. 8, 2005, issued in International Application PCT/US2005/008805; 3 pages.

International Search Report, dated Jul. 10, 2006, issued in International Application PCT/US2005/022152; 1 page.

International Search Report, dated Jul. 27, 2005, issued in International Application PCT/US2005/008804; 3 pages.

Invitation to Pay Additional Fees and Communication Relating to the Results of the Partial International Search, dated Jan. 28, 2008, issued in International Application PCT/US2007/077441; 8 pages.

Invitation to Pay Additional Fees and Communication Relating to the Results of the Partial International Search, dated Jul. 29, 2008, issued in International Application PCT/US2008/050295; 10 pages.

Invitation to Pay Additional Fees and Communication Relating to the Results of the Partial International Search, dated May 15, 2009, issued in International Application No. PCT/US2008/050047; 11 pages.

International Search Report and Written Opinion, dated Sep. 3, 2009, issued in International Application No. PCT/US2008/050047; 17 pages.

Invitation to Pay Additional Fees and Communication Relating to the Results of the Partial International Search, dated May 8, 2009, issued in International Application PCT/US2008/050038; 19 pages.

JavaBoutique, [online], Retrieved from the Internet URL: http://javaboutique.internet.com/utilities/counter.html; Oct. 1, 2002; 2 pages.

Microsoft Corporation, "Microsoft® Windows™ Graphical Environment User's Guide", Version 3.0 for MS-DOS® or PC-DOS Operating System, 1990, Document No. SY06851-0290, pp. Cover-vii, 15-75, 315-353.

Microsoft Corporation, "User's Guide Microsoft® Windows™and MS-DOSs® 6", 1993, pp. Cover-xvi, 112-121.

Movies.com, Jan. 2002, [online] [Retrieved on Dec. 8, 2008]; Retrieved from the Internet URL: http://www.archive.org/web/20020118102516/movies.go.com; 1 page.

Rist et al., "Customizing Graphics for Tiny Displays of Mobile Devices", Personal and Ubiquitous Computing, 2002, vol. 6, pp. 260-268.

Segal et al., "The OpenGL® Graphics System: A Specification (Version 1.5)", © 1992-2003 Silicon Graphics, Inc., Oct. 30, 2003, 333 pages.

Shantzis, "A Model for Efficient and Flexible Image Computing," Computer Graphics Proceedings, Annual Conference Series, Orlando, Florida, Jul. 24-29, 1994, pp. 147-154.

Shiozawa et al., "Perspective Layered Visualization of Collaborative Workspaces," Proceedings of the International ACM SIGGROUP conference on Supporting Group Work Publisher, Nov. 1999, 10 pages.

Siracusa, "Mac OS X 10.4 Tiger: Dashboard", Apr. 28, 2005, [online] [Retrieved on Aug. 1, 2008] Retrieved from the Internet URL: http://arstechnica.com/reviews/os/macosx-10-4.ars/17; 7 pages.

Snippet Software, "Product Spotlight Non-browser based portal solution from Snippets Software", Corporate Portal Newsletter, Oct. 2000, vol. 1, No. 10, 3 pages.

Snippet Software, "Snippets Infomration Delivery Platform", [online] [Retrieved on Jun. 11, 2001]; Retrieved from the Internet URL: http://www.snippets.com/products/; 19 pages.

Snippets Software, "Products Overview", Feb. 2002, [online] [Retrieved on Feb. 5, 2008] Retrieved from the Internet URL: http://web.archive.org/web/20020206061508/http://www.snippets.com/products/; 2 pages.

Staples, "Representation in Virtual Space: Visual Convention in the Graphical User Interface," Proceedings of the SIGCHI Conference on Human Factors in Computing Systems, Apr. 1993 [online] [Retrieved on Dec. 2003] Retrieved from the Internet URL: http://www.nat.org/dashboard/blog.php3 Dec. 2003; 8 pages.

Stardock, "DesktopX General Guide," Aug. 2000, [online] [Retrieved on Jan. 31, 2008]; Retreived from the Internet URL:htp://www.stardock.com/products/desktopx/docs/; 28 pages.

Stardock, "DesktopX Tutorial", Aug. 2000, [online] [Retrieved on Jan. 31, 2008]; Retrieved from the Internet URLl:http://www.stardock.com/products/desktopx/tutorial.html; 40 pages.

Stardock, "DesktopX WhitePaper", Aug. 2000, [online] [Retrieved on Jan. 31, 2008]; Retrieved from the Internet URL: http://www.stardock.net/media/whitepaper_desktopx.html; 15 pages.

Stardock, "The User Guide—Version 2", DesktopX 2000; 57 pages.

Stardock, "What Can It Do? Making Objects", DesktopX Tutorial, 2001, [online] [Retrieved on Apr. 11, 2008]; Retrieved from the Internet URL: http://web.archive.org/web/20011019222825/http://www.stardock.com/products/desktopx/.... ; 6 pages.

Tang et al., "ConNex to Awarenex: Extending Awareness to Mobile Users," SIGCHI '01, AMC, Mar. 31-Apr. 4, 2001, 8 pages.

Thomas et al., "Animating Widgets in the InterViews Toolkit", Lecture Notes in Computer Science, pp. 26-44, 1995.

Ullenboom, "Java is auch eine Insel," 2003, [online] [Retrieved on Apr. 13, 2006]; Retrieved from the Internet URL: http://www.galileocomputing.de/openbook/javainse12//java_140000.htm#Xxx998138, 3 pages.

Van Gelder et al., "Direct Volume Rendering with Shading via Three-Dimensional Textures,"Computer Science Dept., UNiv. of California, Santa, Cruz, CA 95064, Jul. 19, 1996; 17 pages.

VMware™, "VMware™ Workstation User's Manual, Version 3.2", 2002; cover, pp. 12-13.

Wardell, "Apple's Dashboard vs. Konfabulator vs. DesktopX", Skinning the frog, Jul. 1, 2004, [online] [Retrieved on Aug. 1, 2008]; Retrieved from the Internet URL: http://frogboy.joeuser.com/article/19800; 9 pages.

Wardell, "Konfabulator for Windows", Jan. 10, 2004, [online] [Retrieved on Mar. 6, 2006]; Retrieved from the Internet URL: http://www.xpthemes.com/forums.aps?MID=19&CMID=19 &AID=4472, 6 pages.

International Search Report and Written Opinion, dated Oct. 16, 2009, issued in International Application No. PCT/US2008/070217.

Caceres et al., "Widget 1.0 Requirements", [Online] [Downloaded on Sep. 10, 2009]; Retrieved from the Internet at URL: http://www.w3.org/TR/2007/WD-widgets-reqs-20070705; 30 pages.

"Sidekick", [Online] [Retrieved on Oct. 12, 2009] Retrieved from the Internet at URL: http://en.widipedia.org/wiki/Sidekick; 5 pages.

* cited by examiner ered and disorganized, making it difficult for the user to quickly locate the content.

MANAGEMENT OF USER INTERFACE ELEMENTS IN A DISPLAY ENVIRONMENT

RELATED APPLICATIONS

This application claims the benefit of priority from U.S. Provisional Patent Application No. 60/737,899, entitled "Management of User Interface Elements In A Display Environment," filed Nov. 18, 2005, which provisional application is incorporated by reference herein in its entirety.

This application is generally related to the following jointly owned and co-pending patent applications, each incorporated herein by reference in its entirety:

U.S. Provisional Patent Application No. 60/583,125, for "Procedurally Expressing Graphic Objects for Web Pages," filed Jun. 25, 2004;

U.S. patent application Ser. No. 10/874,829, for "User Interface for Assisting in the Installation of an Asset," filed Jun. 22, 2004;

U.S. patent application Ser. No. 11/145,561, for "Presenting Clips of Content," filed Jun. 3, 2005;

U.S. patent application Ser. No. 11/145,560, for "Web View Applications," filed Jun. 3, 2005;

U.S. patent application Ser. No. 11/145,023, for "Clip View Applications," filed Jun. 3, 2005;

U.S. patent application Ser. No. 11/148,010, for "Preview and Installation of User Interface Elements in a Display Environment," filed Jun. 7, 2005;

U.S. Provisional Patent Application No. 60/734,016, entitled "Preview including Theme Based Installation of User Interface Elements in a Display Environment," filed Nov. 4, 2005, which provisional application is incorporated herein by reference in its entirety;

U.S. Provisional Patent Application No. 60/730,956, entitled "Widget Security," filed Oct. 27, 2005, which provisional application is incorporated herein by reference in its entirety;

U.S. patent application Ser. No. 11/282,110, entitled "Preview including Theme Based Installation of User Interface Elements in a Display Environment," filed Nov. 16, 2005; and U.S. patent application Ser. No. 11/346,603, entitled "Multiple Dashboards," filed Feb. 1, 2006.

TECHNICAL FIELD

The disclosed implementations relate generally to graphical user interfaces.

BACKGROUND

A hallmark of modern graphical user interfaces is that they allow a large number of graphical objects or items to be displayed on a display screen at the same time. Leading personal computer operating systems, such as Apple Mac OS®, provide user interfaces in which a number of windows can be displayed, overlapped, resized, moved, configured, and reformatted according to the needs of the user or application. Taskbars, menus, virtual buttons and other user interface elements provide mechanisms for accessing and activating windows even when they are hidden behind other windows.

Although users appreciate interfaces that can present information on a screen via multiple windows, the result can be overwhelming. For example, users may find it difficult to navigate to a particular user interface element or to locate a desired element among a large number of onscreen elements. The problem is further compounded when user interfaces allow users to position elements in a desired arrangement, including overlapping, minimizing, maximizing, and the like. Although such flexibility may be useful to the user, it can result in a cluttered display screen. Having too many elements displayed on the screen can lead to "information overload," thus inhibiting the user to efficiently use the computer equipment.

Many of the deficiencies of conventional user interfaces can be reduced using "widgets." Generally, widgets are user interface elements that include information and one or more tools (e.g., applications) that let the user perform common tasks and provide fast access to information. Widgets can perform a variety of tasks, including without limitation, communicating with a remote server to provide information to the user (e.g., weather report), providing commonly needed functionality (e.g., a calculator), or acting as an information repository (e.g., a notebook). Widgets can be displayed in a display environment and accessed through a user interface, such as a "dashboard." Widgets and dashboards are described in co-pending U.S. patent application Ser. No. 10/877,968, entitled "Unified Interest Layer For User Interface."

Due to the large number of widgets available to a user, a virtual desktop or dashboard can become cluttered and disorganized, making it difficult for the user to quickly locate and access a widget. Moreover, many widgets may not perform as expected or advertised when installed. Some widgets may even present a security risk to the host machine and network resources because they include a virus or are designed to carry out malicious activities. Accordingly, tools are required to manage all aspects of widget deployment and display.

SUMMARY

In some implementations, a user-activated dashboard (also referred to as a "unified interest layer") is provided that can contain any number of user interface elements, referred to herein as "widgets," for quick access by a user. In response to a command from a user, the dashboard is invoked and the widgets are shown on the screen. In one aspect, a widget manager is provided as either a stand alone application, part of an installer process, part of the operating system or otherwise to facilitate management of widgets available to the user. Management functions can include enablement, preview, importation, exportation, organization, installation, deletion, acquisition and the like. Other management functions are possible.

Widgets can be of any type. They can communicate with a remote server to provide information to the user (e.g., a weather report), or they can provide commonly needed functionality (e.g., a calculator), or they can act as an information repository (e.g., a notepad or calendar). Some widgets can provide a combination of these types of functions.

Aspects of the invention can include one or more of the following features. The user interface element can be a widget. The display environment can be a dashboard, a desktop, or other display space.

In some implementations, a widget manager includes a management engine operable to present available widgets in a palette of a user interface display environment, to selectively enable or disable each of the available widgets, and to display enabled widgets in the display environment.

In some implementations, a method of managing widgets for display in a display environment includes: presenting a list of available widgets; receiving user input to enable one or more widgets to be displayed in a display environment; indicating in the list which widgets are enabled and to be displayed in the display environment from the available widgets; and at run time, instantiating each enabled widget in the display environment.

In some implementations, a method of managing widgets for display in a display environment includes: determining usage information for widgets when displayed in a display environment; determining usage criteria associated with the presentation of widgets in the display environment; selectively enabling and disabling at least one widget from the available widgets based on the usage criteria and the usage information; and displaying enabled widgets in the display environment.

In some implementations, a method of managing widgets includes: presenting a list of available widgets in a user interface; enabling a subset of the available widgets; and displaying the subset in a display environment of the user interface.

In some implementations, a method of managing widgets includes: determining user privileges; presenting a list of available widgets based on the user privileges; enabling a subset of the available widgets based on user selection; and displaying enabled widgets in a display environment.

In some implementations, a method for managing widgets includes: determining widgets that are available for display; classifying the available widgets; presenting the available widgets according to the classification; selectively enabling ones of the available widgets; and at run time, displaying enabled widgets in a display environment.

In some implementations, a method of managing widgets includes: identifying available widgets for display in a display environment; presenting the available widgets in a management environment; selectively enabling ones of the available widgets; and displaying enabled widgets in the display environment.

In some implementations, a method for managing widgets includes: identifying available widgets for display in a display environment; determining a criteria for selecting ones of the available widgets; and displaying the selected ones of the available widgets.

Other methods, apparatuses, computer-readable mediums and devices having various features are also disclosed.

DETAILED DESCRIPTION

Hardware Architecture

Figure 1:
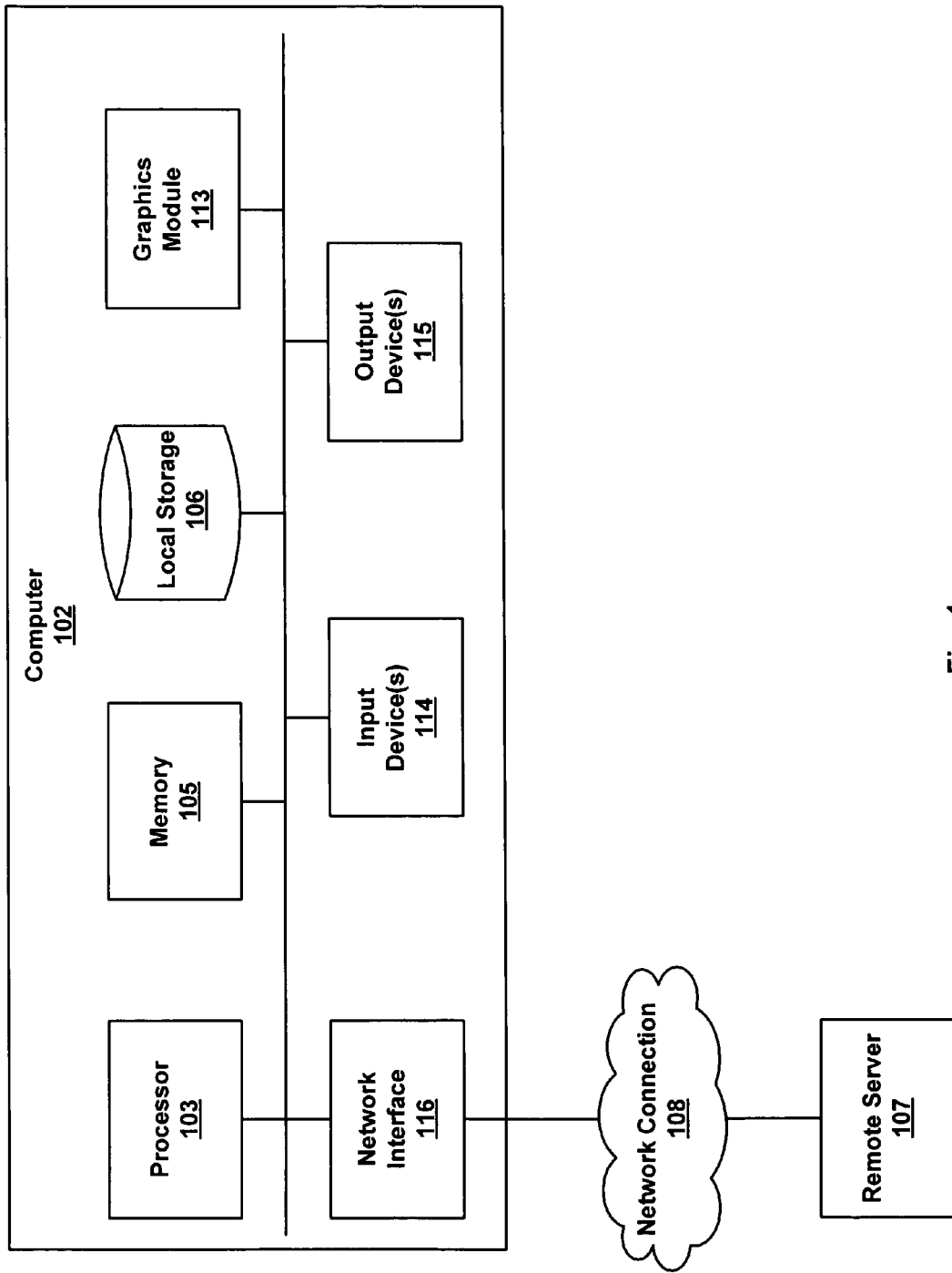
FIG. 1 is a block diagram of a hardware architecture for previewing, installing, managing and operating widgets in a display environment.

FIG. 1 is a block diagram of a hardware architecture 100 for previewing, installing, managing and operating widgets in a dashboard. The architecture 100 includes a personal computer 102 coupled to a remote server 107 via a network interface 116 and a network 108 (e.g., local area network, wireless network, Internet, intranet, etc.). The computer 102 generally includes a processor 103, memory 105, one or more input devices 114 (e.g., keyboard, mouse, etc.) and one or more output devices 115 (e.g., a display device). A user interacts with the architecture 100 via the input and output devices 114, 115.

The computer 102 also includes a local storage device 106 and a graphics module 113 (e.g., graphics card) for storing information and generating graphical objects, respectively. The local storage device 106 can be a computer-readable medium. The term "computer-readable medium" refers to any medium that participates in providing instructions to a processor for execution, including without limitation, non-volatile media (e.g., optical or magnetic disks), volatile media (e.g., memory) and transmission media. Transmission media includes, without limitation, coaxial cables, copper wire, fiber optics, and computer buses. Transmission media can also take the form of acoustic, light or radio frequency waves.

While dashboards and widgets are described herein with respect to a personal computer 102, it should be apparent that the disclosed implementations can be incorporated in, or integrated with, any electronic device that is capable of using widgets, including without limitation, portable and desktop computers, servers, electronics, media players, game devices, mobile phones, email devices, personal digital assistants (PDAs), embedded devices, televisions, etc.

A system and methods are provided for managing widgets. The systems and methods can be stand alone, or otherwise integrated into a more comprehensive application. In the materials presented below, an integrated system and method for previewing, installing, managing and operating widgets and dashboards is disclosed. However, one of ordinary skill in the art will recognize that the engines, methods, processes and the like that are described with respect to the management of widgets can themselves be an individual process or application, part of an operating system, a plug-in or the like. In one implementation, the system and methods can be implemented as one or more plug-ins that are installed and run on the personal computer 102. The plug-ins are configured to interact with an operating system (e.g., MAC OS® X, WINDOWS XP, LINUX, etc.) and to perform the various dashboard, management and widget functions, as described with respect of FIGS. 2-7. A system and method for previewing, installing, managing and operating widgets and dashboards can also be implemented as one or more software applications running on the computer 102. Such a system and method can be another widget that is configurable to communicate with other widgets, applications and/or operating systems. Such a system and method can also be characterized as a framework or model that can be implemented on various platforms and/or networks (e.g., client/server networks, stand-alone computers, portable electronic devices, mobile phones, etc.), and/or embedded or bundled with one or more software applications (e.g., email, media player, browser, etc.).

For illustrative purposes, in the following description the invention is described as a feature of an operating system 305 (FIG. 3) for use in installing and managing widgets in a dashboard environment; however, one skilled in the art will recognize that the techniques of the present invention can be implemented in other contexts as well, including those described above, to install and manage other elements, and in other environments including environments associated with applications or operating systems (e.g., a desktop environment, a display environment associated with a browser executing on a mobile communication device, etc.). Examples of other environments include e-mail environments, desktop environments, application environments, hand-held display environments, and other display environments.

Dashboard Overview

Figure 2:
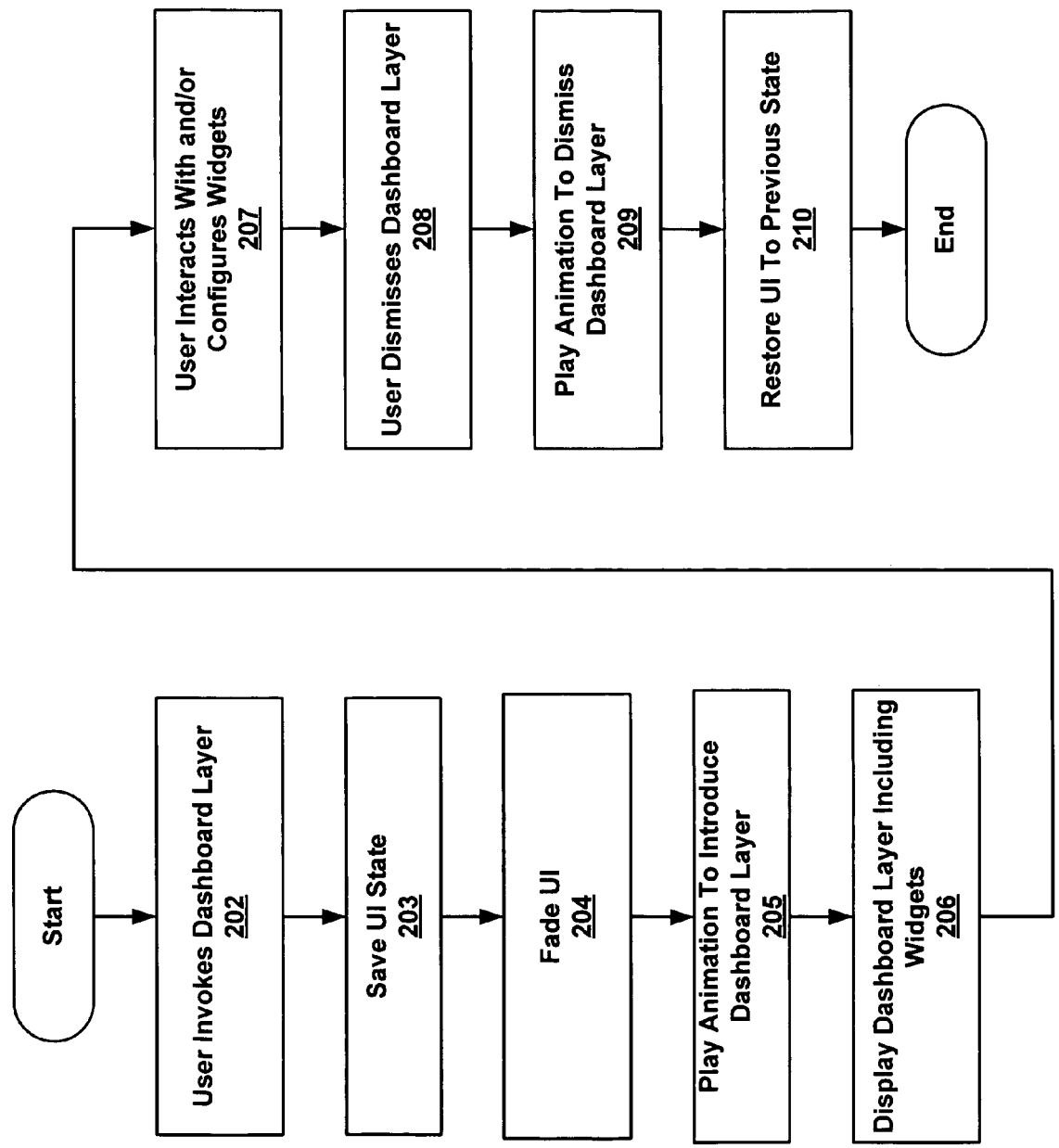
FIG. 2 is a flow diagram of a process for activating and using a dashboard.

FIG. 2 is a flow diagram of an implementation of a process for activating and using a dashboard. A dashboard layer (also referred to herein as a "unified interest layer" or "dashboard") is used to manage and display widgets. A user can invoke a dashboard (202) by hitting a designated function key or key combination, or by clicking on an icon, or by selecting a command from an onscreen menu, or by moving an onscreen cursor to a designated corner of the screen. In response to such user input, the current state of the user interface is saved (203), the user interface is temporarily inactivated (204), an animation or effect is played or presented to introduce the dashboard (205) and the dashboard is displayed with one or more widgets (206). If applicable, a previous state of the dashboard is retrieved, so that the dashboard can be displayed in its previous configuration.

In some implementations, the dashboard is overlaid on an existing desktop user interface (UI). When the dashboard is activated, the existing UI may be faded, darkened, brightened, blurred, distorted, or otherwise altered to emphasize that it is temporarily inactivated. The existing desktop may or may not be visible behind the dashboard. The desktop can also be shrunk to a small portion of the display screen while the dashboard is active, and can be re-activated by clicking on it.

In some implementations, the desktop is shrunk and presented as a widget. The desktop can be re-activated by clicking on the widget.

The user interacts with and/or configures widgets as desired including managing the display of the widgets in the display environment (207). In some implementations, the user can move widgets around the screen, and can resize widgets if applicable. A user can enable certain widgets from a list of available widgets, retrieve, preview, install, import, export, email, or otherwise manage the widgets. Widget management is discussed in greater detail below.

The user dismisses the dashboard (208) by invoking a dismissal command, which causes the normal UI to return or re-present itself to the display screen. In some implementations, the dashboard is dismissed when the user presses a function key or key combination (which may be the same or different than the key or combination used to activate the dashboard), or clicks on a close box or other icon, or clicks on negative space within the dashboard (e.g., a space between widgets), or moves an onscreen cursor to a predefined corner of the screen.

In some implementations, the dashboard is automatically dismissed (i.e., without user input) after some predetermined period of time or in response to a trigger event. An animation or other effect is played or presented to provide a transition as the dashboard is dismissed (209). When the dashboard is dismissed, the current configuration or state of the widgets (e.g., position, size, etc.) can be stored, so that it can be retrieved the next time the dashboard is activated. In some implementations, an animation or effect is played or presented when re-introducing the UI. The UI is restored to its previous state (210) so that the user can resume interaction with software applications and/or the computer operating system.

In some implementations, the dashboard is configurable. The user can select a number of widgets to be displayed, for example, by dragging the widgets from a configuration bar (or other user interface element) onto the dashboard, or by selecting widgets to be enabled from a list of available widgets using a management presentation window. Management presentation windows are discussed in greater detail below. The configuration bar can include different types of widgets, and can be categorized and/or hierarchically organized. In some implementations, in response to the user dragging a widget onto the configuration bar, the widget is downloaded from a server and automatically installed (if not previously installed). In some implementations, certain widgets must be purchased, so the user is requested to provide a credit card number or some other form of payment before the widget is installed on the user's machine. In some implementations, widgets are already installed on the user's machine, but are only made visible when they have been dragged from the configuration bar onto the dashboard or enabled (e.g., by checking an enable box associated with a given widget in a UI presented by a widget manager). The configuration bar is merely an example of one type of UI element for configuring the dashboard. Other configuration mechanisms can be used, such as a widget manager, an icon tray, or menu system.

It should be apparent that there are many ways in which dashboards and widgets can be displayed other than those implementations described herein. For example, widgets can be displayed on any user interface or user interface element, including but not limited to desktops, browser or application windows, menu systems, trays, multi-touch sensitive displays and other widgets.

Software Architecture

Figure 3:
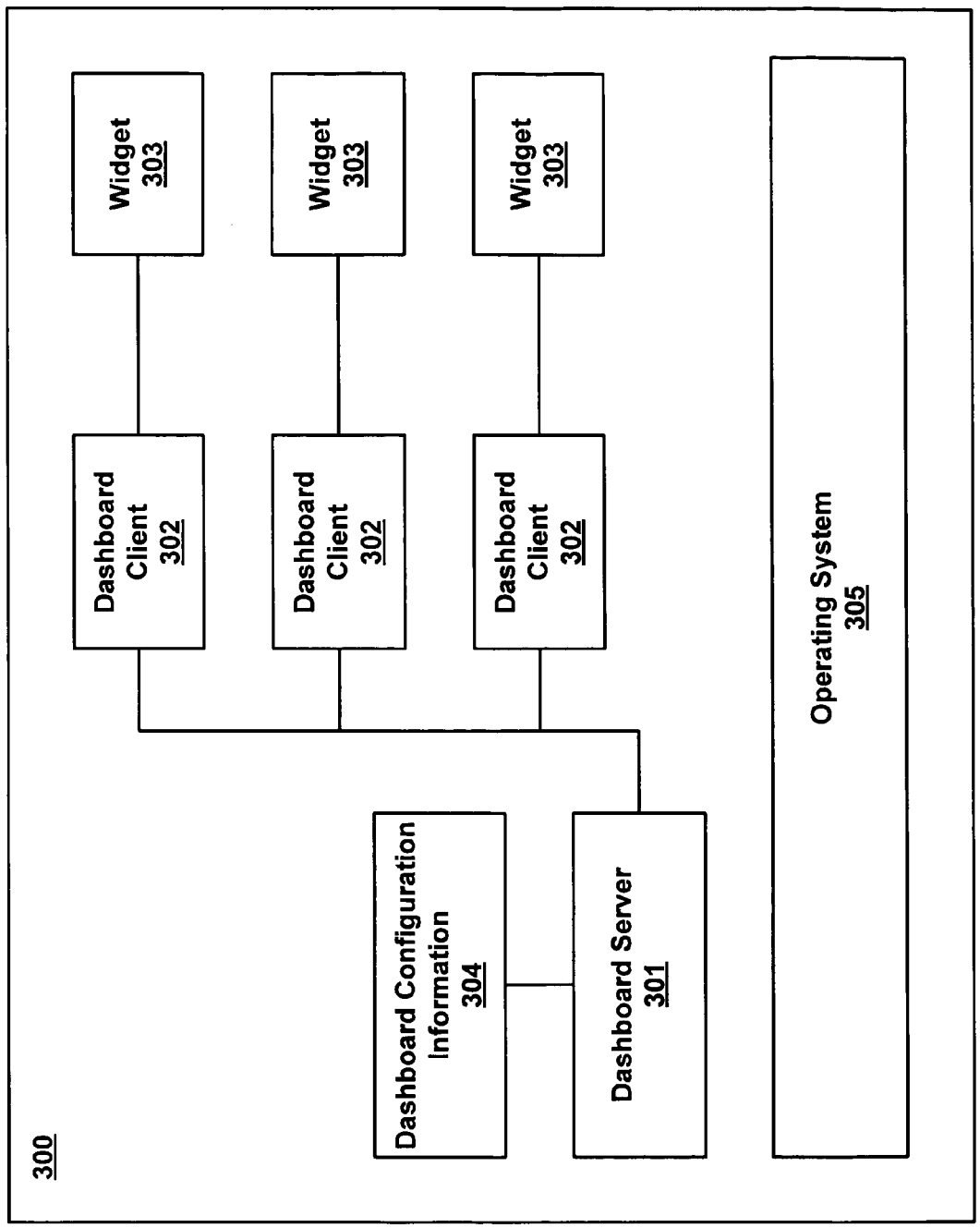
FIG. 3 is a block diagram depicting a software architecture for previewing, installing, managing and operating widgets in a display environment.

FIG. 3 is a block diagram of a software architecture 300 for implementing one or more dashboards, and displaying and managing widgets. The software architecture 300 generally includes a dashboard server 301, one or more dashboard clients 302, an operating system 305 and one or more widgets 303. The server 301 and/or clients 302 use dashboard configuration information 304 to specify configuration options for displaying the widgets 303, including access levels and the like (if applicable). Such configuration information can include information for two or more dashboards configured by the same user or by different users.

In some implementations, the widgets 303 are displayed using HTML and related web technology. The dashboard server 301 can manage and launch the dashboard client 302 processes. In one implementation, each dashboard client 302 loads a widget 303 (e.g., an HTML webpage) and related resources needed to display the page. In some implementations, the dashboard clients 302 display the widgets 303 without a conventional window frame, menu bar, or other components typically associated with on-screen windows. This technique provides a clean, straightforward display of the overall dashboard to reduce confusion and clutter. One or more dashboard clients 302 can display their respective widgets 303 by rendering web pages into a "WebView," as described in U.S. patent application Ser. No. 11/148,010, entitled "Preview and Installation of User Interface Elements in a Display Environment." The size of each WebView is defined as metadata associated with the corresponding widget 303. The server 301 provides data for rendering a separate layer that can be overlaid on the normal desktop of the user interface. The widgets 303 are rendered into the separate layer which, in one implementation, is drawn on top of the normal desktop, so as to partially or completely obscure the desktop while the dashboard is active.

Dashboard Server

The dashboard server 301 can be a stand-alone process, embedded in another process, or part of the operating system 305. The server 301 can be located at the computer 102 or at the remote server 107. In some implementations, the server 301 provides functionality for one or more processes, including but not limited to: non-widget UI management, window management, fast login, event management, loading widgets, widget arbitration, Core Image integration and widget preference management, as described in U.S. patent application Ser. No. 11/148,010, entitled "Preview and Installation of User Interface Elements in a Display Environment."

Dashboard Client

In some implementations, a dashboard client 302 is a process that uses, for example, objects that are defined as part of a development environment, such as Apple Computer's Cocoa Application Framework (also referred to as the Application Kit, or AppKit) for the Mac OS® operating system. In some implementations, the dashboard clients 302 can be implemented as simplified browser screens that omit conventional interface features such as a menu bar, window frame, and the like.

Widget Format

In one implementation, each widget 303 is implemented as an HTML file. The HTML file can reference other local and remote resources such as style sheets (e.g., Cascading Style Sheets), other HTML files, JavaScript files, images, and the like. Widgets 303 can be implemented using, for example, a flat bundle file format or a packaged HTML file format. In some implementations, the Flat Bundle format includes an info.plist file.

The Info.plist files describe a widget 303 and provide an identifier for a widget 303. Table I provides an example of Info.plist file contents.

TABLE I

Example of Info.plist File Contents

| Key | Type | Description/Value |
| --- | --- | --- |
| CFBundleIdentifier | CFString | com.apple.widget <widget name> |
| CFBundleName | CFString | Name of the widget. |
| MainHTML | CFString | Name of main HTML resource. |
| Width | CFNumber | Default width of the widget. |
| Height | CFNumber | Default height of the widget. |
| DefaultImage | CFString | Resource name of default PNG file. |
| Plugin (optional) | CFString | Resource name of native plug-in. |
| AllowFileAccessOutsideofWidget | Boolean | Access to files across the file system; limited by the users permissions. |
| AllowFullAccess | Boolean | Access to the file system, Web Kit and standard browser plug-ins, Java applets, network resources, and command-line utilities. |
| AllowInternetPlugins | Boolean | Access to Web Kit and standard browser plug-ins. |
| AllowJava | Boolean | Access to Java applets. |
| AllowNetworkAccess | Boolean | Access to any resources that are not file based. |
| AllowSystem | Boolean | Access to command-line utilities using widget script object. |

The keys AllowFileAccessOutsideofWidget, AllowFullAccess AllowInternetPlugins, AllowJava, AllowNetworkAccess, and AllowSystem are Boolean types that can be set by a widget author to enable certain levels of resource access.

Dashboard Invocation

Figure 4A:
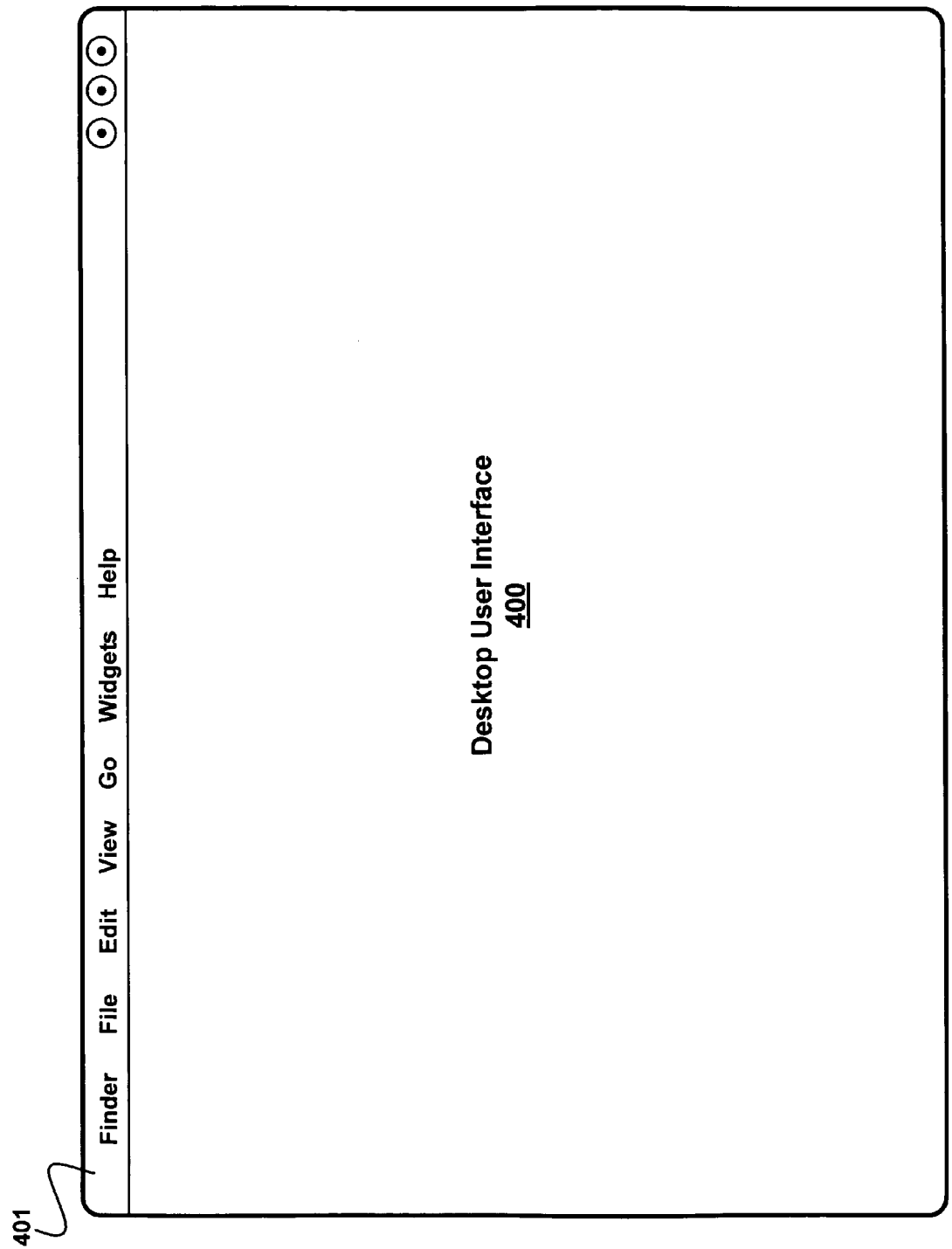
FIG. 4a is a screen shot depicting a desktop user interface prior to activation of a dashboard.

FIG. 4a depicts a desktop user interface 400 prior to activation of a dashboard. The desktop user interface 400 (also referred to herein as "desktop") is a conventional user interface as may be provided by an operating system, such as Mac OS®. The desktop 400 has a background image, menu bar 401, and other standard features. As is known in the art, the desktop 400 may also include windows, icons, and other elements (not shown). The user activates the dashboard by selecting an item from a menu, or by clicking on an icon, or by pressing a function key or key combination, or by some other means for invoking activation.

Figure 4B:
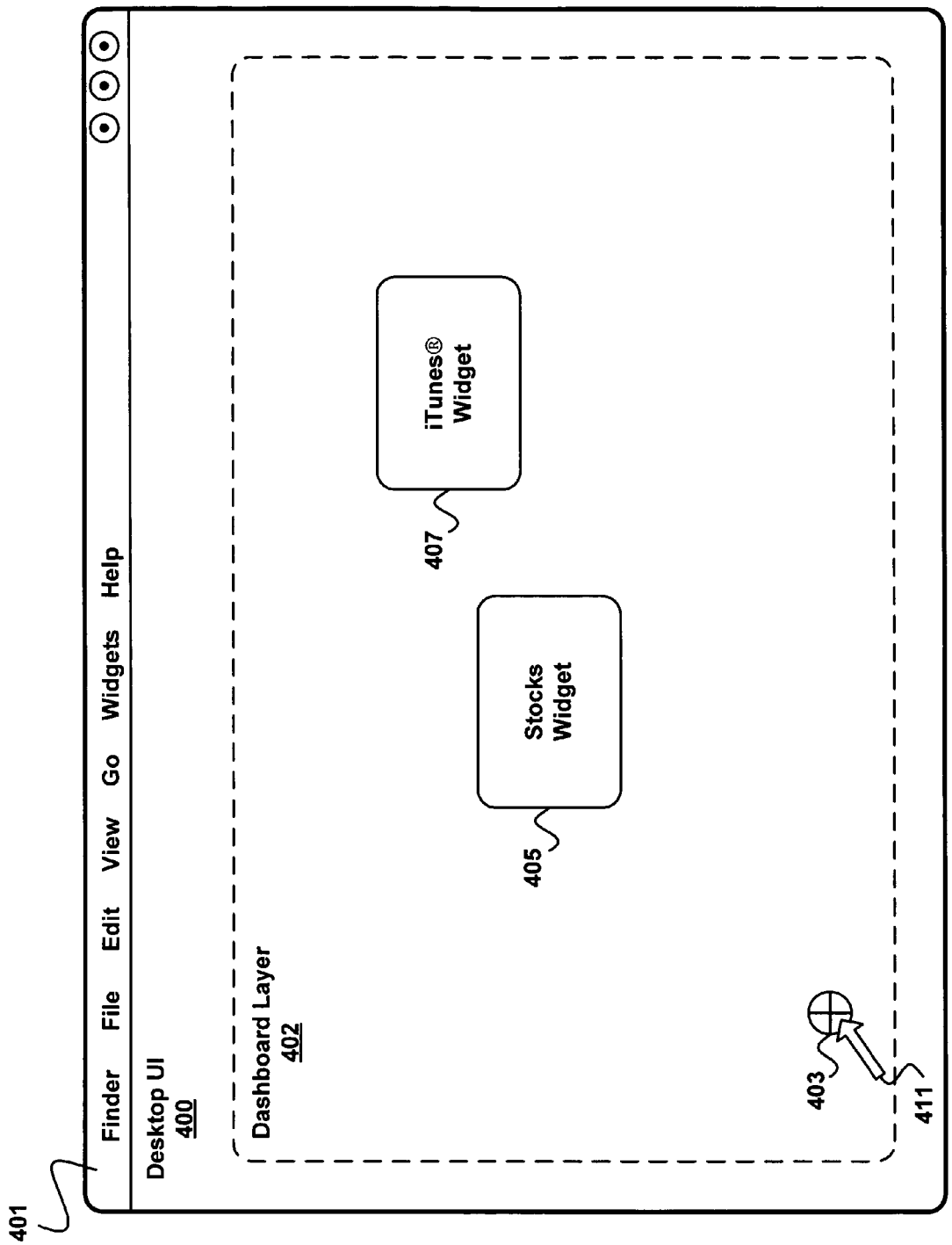
FIG. 4b is a screen shot depicting an initial state for a dashboard.

FIG. 4b depicts an initial state for a dashboard layer 402. In some implementations, a configuration bar icon 403 is initially displayed. Alternatively, upon activation the dashboard layer 402 can display one or more default widgets 405, 407. If the dashboard layer 402 has previously been activated and configured, the widgets 405, 407, can be displayed as previously configured. As shown in FIG. 4b, the dashboard layer 402 is not necessarily visible as a distinct layer. However, its various components (such as widgets, icons, and other features) are visible. In some implementations, these components are displayed in a transparent layer, thus maintaining the visibility of the desktop 400 to the user. In some implementations, the desktop 400 and its components are darkened (or blurred, or otherwise visually modified) while the dashboard layer 402 is active, so as to emphasize that the desktop 400 is temporarily inactive. In other implementations, the desktop 400 is not visible while the dashboard layer 402 is active. The user can reactivate the desktop 400 and dismiss the dashboard layer 402 by clicking on an area of the screen where no dashboard element is displayed (i.e., "negative space"). In some implementations, other commands, key combinations, icons, or other user input can be used to dismiss the dashboard layer 402.

Figure 4C:
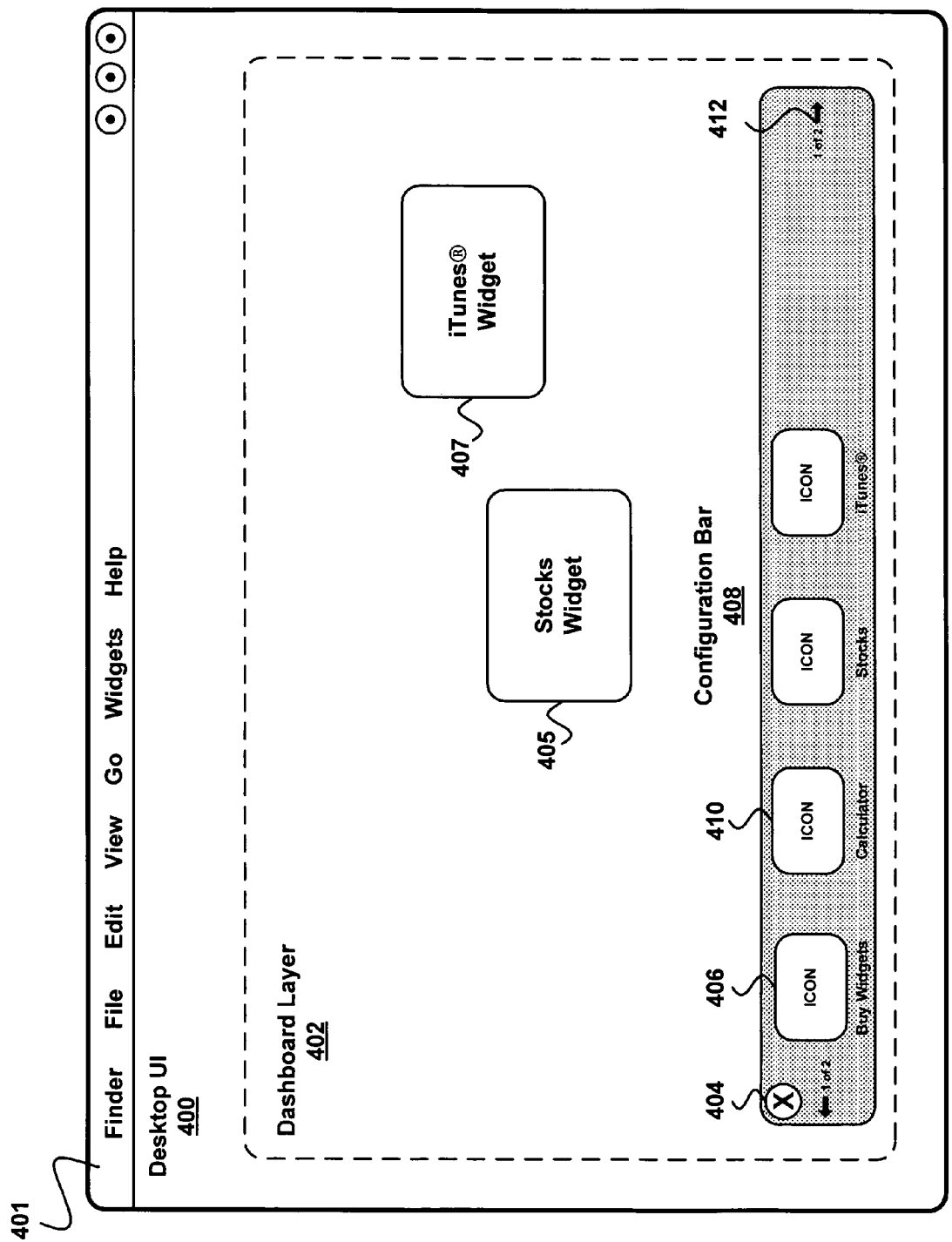
FIG. 4c is a screen shot depicting a configuration bar for a dashboard.

In some implementations, the user can drag the icon 403 to any location on the screen, and the position of the icon 403 will remain persistent from one invocation of the dashboard layer 402 to the next. The user can click on the icon 403 to activate the configuration bar 408, as shown in FIG. 4c. The configuration bar 408 provides access to various widgets that can be placed on the dashboard. In some implementations, a text label is shown for each available widget (e.g., calculator, stocks, iTunes®, etc.). In some implementations, an icon is shown for each available widget (e.g., calculator icon 410). If many widgets are available, the widgets may be arranged hierarchically by type (e.g., game widgets, utility widgets, etc.), or alphabetically, or by any other categorization methodology. For example, a number of categories may be displayed, and clicking on one of the categories causes a pull-down menu to be displayed, listing a number of widgets in that category. In some implementations, a buy widget 406 is also available, allowing the user to select widgets from an online store or website.

Note that the particular configuration and appearance of configuration bar 408 in FIG. 4c is merely exemplary, and that many other arrangements are possible. For example, widgets can be installed from other locations, other applications or other environments, without requiring that they first be part of the configuration bar 408. The user can dismiss the configuration bar 408 by clicking on dismissal button or icon 404.

Alternative Implementation of Configuration Bar

Figure 4D:
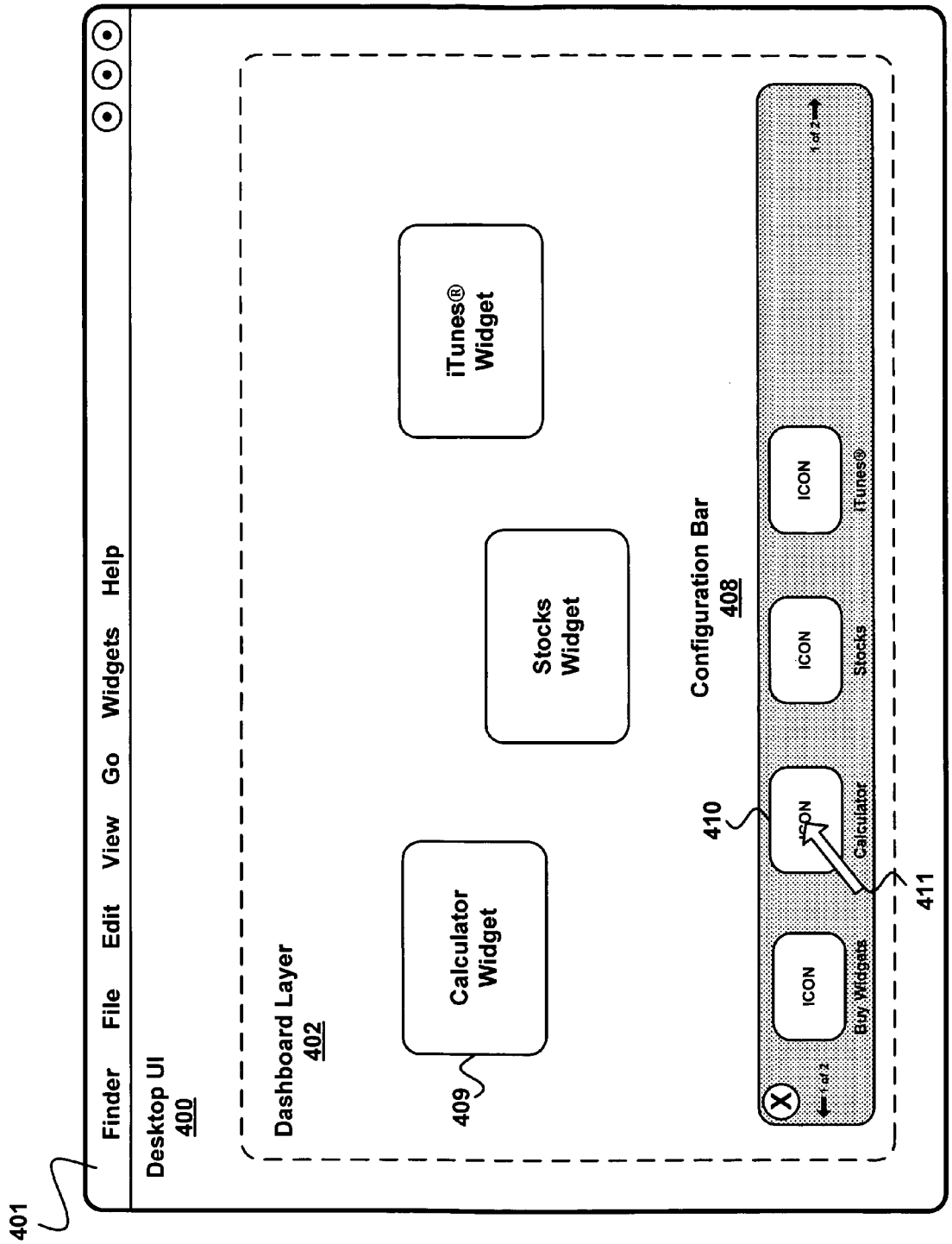
FIG. 4d is a screen shot depicting user selection of a widget from the configuration bar.
Figure 4E:
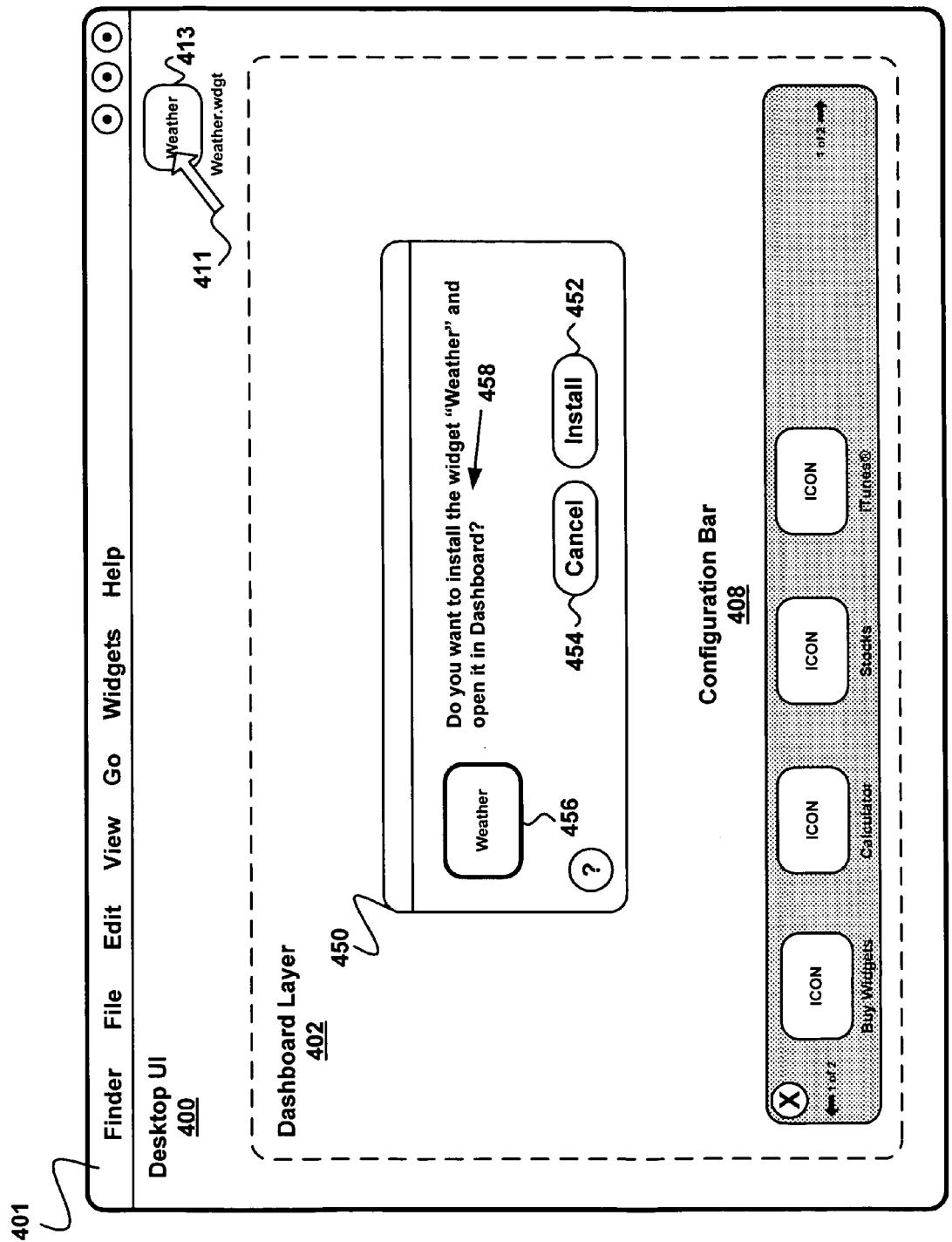
FIG. 4e is a screen shot depicting an installation confirmation.
Figure 4F:
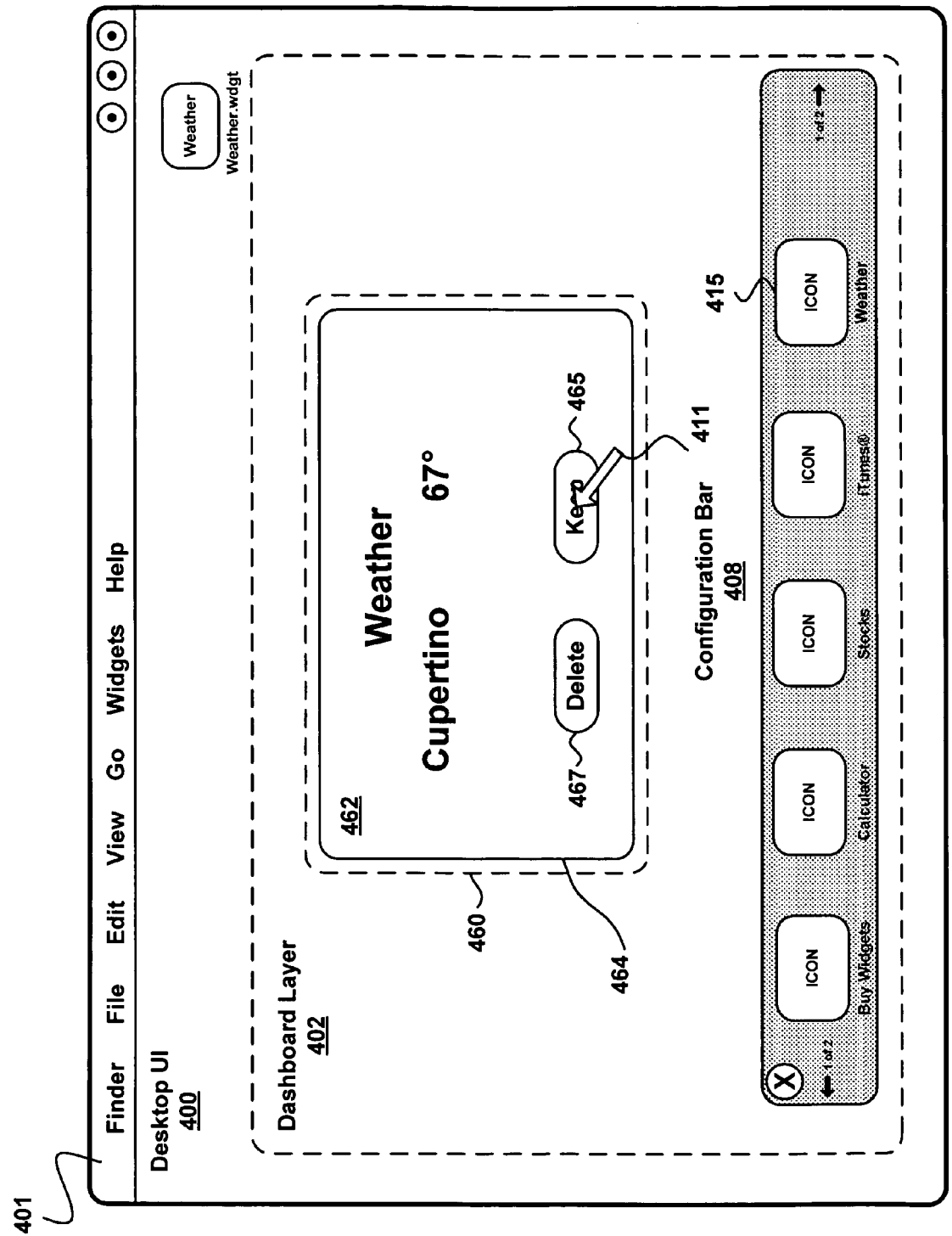
FIG. 4f is a screen shot depicting a preview of a user interface element that has been selected to be installed.
Figure 4G:
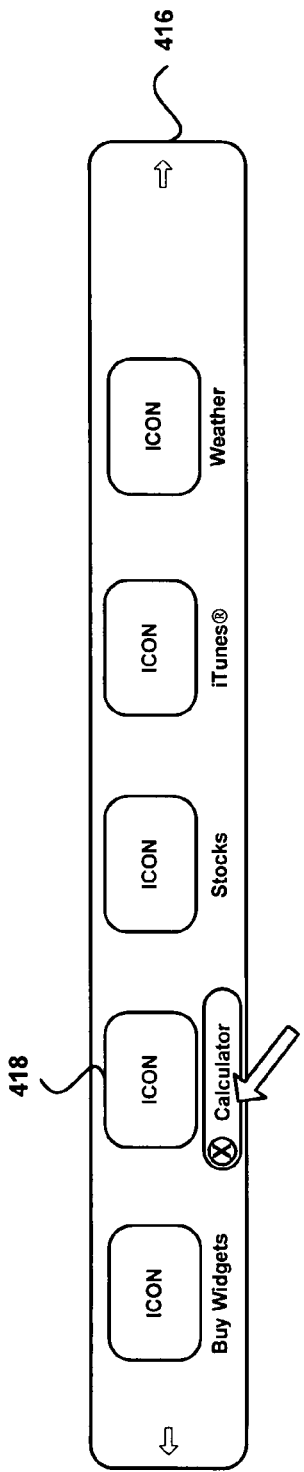
FIGS. 4g-4i illustrate the deletion of widgets from a configuration bar.
Figure 4H:
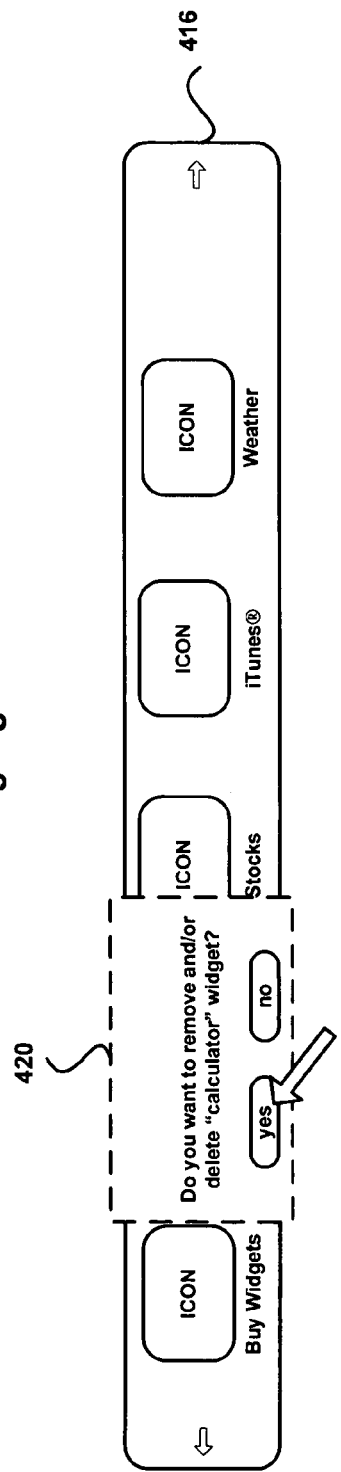
Figure 4I:
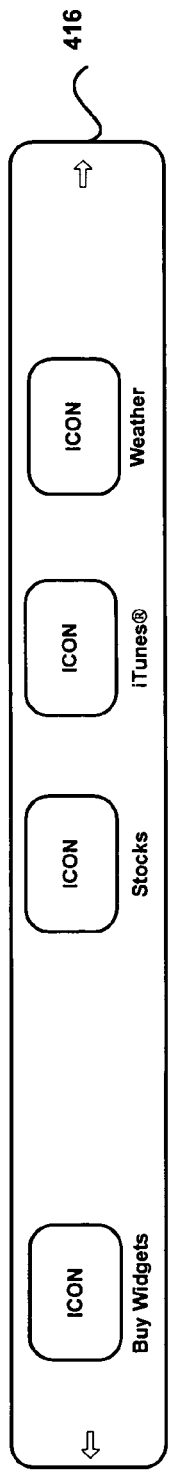

FIGS. 4g-4i illustrate an alternative implementation for deleting a widget from a configuration bar 416. For example, when a user moves a cursor onto the "calculator" label (e.g., a mouse-over) associated with a calculator widget 418, the label is highlighted or otherwise altered, and a delete mechanism (e.g., a delete button) is displayed. If the user clicks or otherwise invokes the delete mechanism, a confirmation overlay 420 is displayed asking the user to confirm the removal and/or deletion of the "calculator" widget. In some implementations, the confirmation overlay 420 is semi-translucent. If the user requests deletion (e.g., clicking the "yes" button), then the calculator widget 418 is removed from the configuration bar 416, as shown in FIG. 4i.

Installation of Elements

Elements, including user interface elements such as widgets can be installed in a display environment as discussed below. One display environment, a dashboard, will be used for illustrative purposes. Installation can include a preview operation. Installation can include selection of the element, such as by a drag and drop action. Other selection means can be used. In one example, a user can drag widgets from configuration bar 408 onto the surface of the dashboard (in other words, anywhere on the screen), using standard drag-and-drop functionality for moving objects on a screen. Alternatively, the user can select widgets by selecting particular ones of the widgets to be enabled in management presentation window as is discussed in greater detail below.

FIG. 4d depicts the selection of a calculator widget icon 410 from the configuration bar 408. A calculator icon 410 associated with a calculator widget 409 is highlighted, or otherwise augmented or embellished, to indicate that it has been selected by a user with cursor 411.

In some implementations, widgets in the configuration bar 408 are smaller than their actual size when installed. When the user clicks on a widget and begins to drag it into a dashboard or other display environment, the widget is animated to its actual or installed size to assist the user in the real-time layout of the dashboard. By animating the widget to its actual size, the user will know the actual size of the widget prior to its installation.

In some implementations, an animation, such as a ripple animation, is shown when the user "drops" a widget by releasing a mouse button (or equivalent input device) to place a widget at the desired location. In one implementation, the dragging of the widget to the dashboard invokes an installation process for installing the widget including previewing. After installation, the user can move a widget, to any other desired location, or can remove the widget from the screen, for example by dragging it off the screen, or dragging it back onto the configuration bar 408, by invoking a remove command, disabling a widget in a menu associated with a widget manager or canceling the installation during the preview. In some implementations, the position, state, and configuration of a widget are preserved when the dashboard layer 402 is dismissed, so that these characteristics are restored the next time the dashboard layer 402 is activated.

In some implementations, widgets and/or dashboards (including widgets) can be installed from within a running application. For example, a widget and/or dashboard (including widgets) can be an attachment to an email. When the user clicks the attachment, an installation process is invoked for the widget and/or dashboard which can also include a preview.

Widgets can be created or instantiated using an installer process. The installer process can include a separate user interface or an integrated user interface (e.g., integrated in the display environment or separate from the display environment, for example, in another display environment associated with another application, such as an email application) for selecting and installing widgets in a display environment. For example, a widget received as an email attachment can be launched by a user from directly within a user interface of the email application.

Widgets can be installed, managed and/or instantiated using an installer process. The installer process can include a separate user interface or an integrated user interface (e.g., integrated in the display environment or separate from the display environment for example in another display environment associated with another application, such as an email application) for selecting, installing and managing widgets in a display environment. Thus, the installation area for the widget can be embedded within an application display area or window. For example, if a user receives a widget as an attachment to an email, the user can invoke and install the widget from within the email message window without the need for a separate installation window.

Installation processes for widgets are described in U.S. Provisional Patent Application Ser. No. 60/734,016, entitled "Preview including Theme Based Installation of User Interface Elements in a Display Environment," including additional functionality related to preview, security, themes and deletion functionality. The installer process can include management functionality. Alternatively, a separate management process can be provided. As used herein, the term "process" refers to a combination of functions that can be implemented in hardware, software, firmware or the like. By way of example, an installer based implementation is discussed below. Other variations are possible.

Installer Process Engines Including Management Engine

Figure 5:
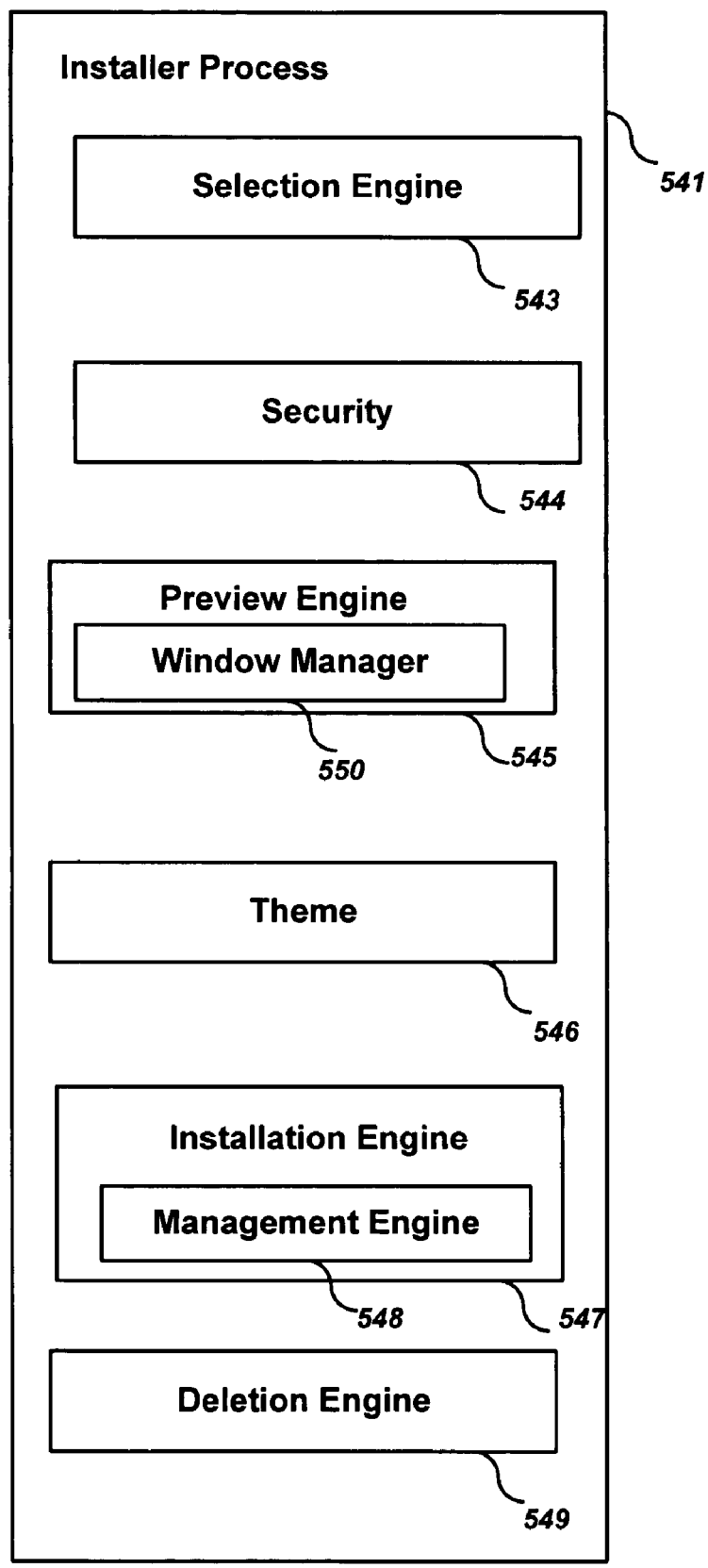
FIG. 5 is a block diagram of an installer process.

By way of example, management functions for managing various aspects of the display of widgets in a display environment can be incorporated in an installer process. FIG. 5 is a block diagram of an installer process 500 for installing widgets in a display environment, including a selection engine 543, a security engine 544, a preview engine 545, a theme engine 546, an installation engine 547 including a management engine 548, and a deletion engine 549.

Selection Engine

The selection engine 543 is used to select and present (e.g., a static presentation) a widget for installation. The selection engine 543 can be invoked in a display environment and can produce an installation area (e.g., a dialog, a panel, a window, etc., and hereinafter referred to as an "installation window"), that acknowledges the user's initiation of the installer process. The installation window can include a presentation of a selected widget (or a reference thereto as described below), along with various buttons that may be activated by the user or otherwise to invoke functionality in the installer process.

A screen shot showing an installation window 450 in a user interface is shown in FIG. 4e. Installation window 450 can include one or more interactive features (e.g., buttons) that allow a user to install (e.g., install button 452), or cancel the operation (e.g., cancel button 454). In some implementations, preview is automatic. Alternatively, preview can be selected for enablement prior to installation. Installation window 450 can include a reference 456 and a prompt 458, as described below.

In some implementations, the installation window 450 is invoked by clicking on a widget file or package. For example, a weather widget file 413 (e.g., "weather.wdgt") can be downloaded to the desktop 400 from a web site. When the user double clicks the "weather.wdgt" file with cursor 411, the installation window 450 is displayed in the dashboard layer 402, as shown in FIG. 4e.

Security Engine

The security engine 544 is used to determine a security access level (or risk level, or both) for either the user or the element to be installed. Security engine 544 can be used to limit the ability of the user to install particular kinds of elements (e.g., based on categories or criteria). In addition or alternatively, security engine 544 is used to determine a security access level (or risk level or both) of an element to be installed. Based on the security access/risk level, one or more operational or functional constraints can be placed on the element during the preview process. For example, limitations on the ability of the previewed element to interact, access, read or write data, monitor output of other system resources, access other system resources, or other limitations can be invoked. The invocation can be temporary, for a predetermined time period, or until the preview has terminated and completed (non-limited) installation has been performed. Functionality or operations of the element can be enabled or disabled, depending on the access level. The security engine 544 can use metadata associated with the element to be installed, user input, contextual information, file type information, default data, read/write preferences, cookies and/or other information to determine the access/risk level. Access control lists including white lists (e.g., including lists identifying certified or otherwise safe elements), black lists (e.g., including lists identifying un-certified or otherwise un-safe elements) and the like can be used to determine the access/risk level.

Various techniques for widget security are described in U.S. Provisional Patent Application No. 60/730,956, entitled "Widget Security,".

Preview Engine

The preview engine 545 is used to preview (e.g., dynamically) an element (e.g., a widget) that has been selected to be installed. Referring again to FIG. 4f, the preview engine 545, when invoked, provides an area (hereinafter "a presentation area or presentation window 462" or specifically a "widget window" when used to display a widget) into which the selected element can be displayed. Preview is discussed in greater detail in U.S. patent application Ser. No. 11/148,010, for "Preview and Installation of User Interface Elements in a Display Environment."

Associated with the preview is a preview designator 464. In one implementation, the preview designator 464 is displayed along with the user interface element being installed (e.g., widget). The preview designator 464 can be of the form of a frame, a carpet on which the presentation window 462 is disposed, a preview theme element, or other designator that overlays, surrounds, bounds or otherwise is associated with the presentation window 462. The combination of the presentation window 462 and the preview designator 464 comprise an installation area for the user interface element to be installed. The installation area can be part of the display environment in to which the element is to be installed (e.g., part of the dashboard) or part of a separate display environment (e.g., part of another user interface, another user interface element, another application, or process, etc.).

When displaying a fully interactive widget in the presentation window 462, user input can be accepted that can result in changes in the presentation. For example, if the widget includes a URL that may be linked to, interaction can include the generation of an underlying page request and the presentation of the requested page in the presentation window 462. Interaction with user interface elements is described in U.S. patent application Ser. No. 11/145,561, for "Application Clipper." If the interaction is not allowed, a display prompt can be shown to indicate that the operation or function is temporarily disabled during the preview operation.

Window Manager

In some implementations, a window manager 550 is associated with the preview engine 545. The window manager 550 can be a separate process that is used to support the interaction between the presentation window 462, preview designator 464 and the installation window 460 described above. Window management is described in greater detail in U.S. Provisional Patent Application Ser. No. 60/734,016, for "Preview including Theme Based Installation of User Interface Elements in a Display Environment."

Theme Engine

Theme engine 546 is operative to provide additional content to accompany the content displayed in the presentation window or installation window. The theme engine 546 is operative to determine a theme to be associated with an item to be installed (e.g., a widget), identify additional content for concurrent display, and facilitate the display of the additional content. Additional content can be of the form of a frame that is used to bound the item to be installed on one or more sides. Examples of additional content include a picture frame, a content player (e.g., a video player, a still image player, etc.). The additional content can be static or include functional elements (e.g., buttons, for example to play content). Themes and processes associated therewith are discussed in greater detail in "Preview including Theme Based Installation of User Interface Elements in a Display Environment."

Installation Engine

The installation engine 547 is operative to install/instantiate the selected widget in the display environment. The installation engine 547 can copy or move as required the selected widget to an appropriate volume and store the data structures (including preference data, identification data, scripts, navigation data and the like) for use in the display environment. In some implementations, the installation engine 547 includes an automatic invocation of the underlying display environment with the installed user interface element presented (i.e., the installation engine 547 installs the widget in, and opens up, a dashboard including the installed widget in a preview mode). Associated with the installation engine 547 can be a management engine 548 for managing all aspects of control and presentation of widgets. Management engines are discussed in greater detail below.

Deletion Engine

The deletion engine 549 provides control for widgets after installation. The deletion engine 549 can be a separate process from the installer process 541, or included therein. The deletion engine 549 can receive input and display user interface elements (dialogs and the like) to ensure that deletion operations are effectuated as required. The deletion engine 549 can be responsive to the selection of a user interface element, a portion of the element, controls associated with the element and the like.

In some implementations, the installer process 541 is part of a separate process that is not associated with a dashboard. Alternatively, the installer process 541 can be part of a dashboard application and be activated, by for example, by selecting a widget for addition to the dashboard, or by selecting a management or installation icon or the like. Selection can include for example double clicking on a widget displayed in a configuration bar 408, selecting a widget for import from another system or environment and the like (shown in FIG. 4c). Other installation tools are possible.

Dashboard Environment

In a dashboard environment, one or both of the installer process 541 or management process including management functions discussed below can include either or both of a widget bar and a management palette and an associated installer process. The installer process when invoked can cause the display of the widget bar or the management palette in the user interface. In one implementation, the dashboard itself, as currently configured can also be displayed when the installer process is invoked. The installer process can then be invoked to select available widgets for installation/enablement, preview widgets, or remove installed widgets (e.g., remove widgets from the widget bar) depending on the configuration of the installer process.

Desktop Environment

In a desktop environment, installer process 541 or management process can be of the form of an application that can be invoked (automatically, by the user, by the operating system, by an application or other invocation tool) to present user interface elements that are available to be installed/enabled in the desktop environment. The installer application can include one or both of a user interface element bar and a management palette and an associated installer process. The installer process when invoked can cause the display of the user interface element bar and/or management palette in the user interface. The installer process can then be invoked to select available user interface elements for installation/enablement, preview user interface elements, or remove installed user interface elements (i.e., remove user interface elements from the user interface elements bar) depending on the configuration of the installer process.

Installation Process

Figure 6:
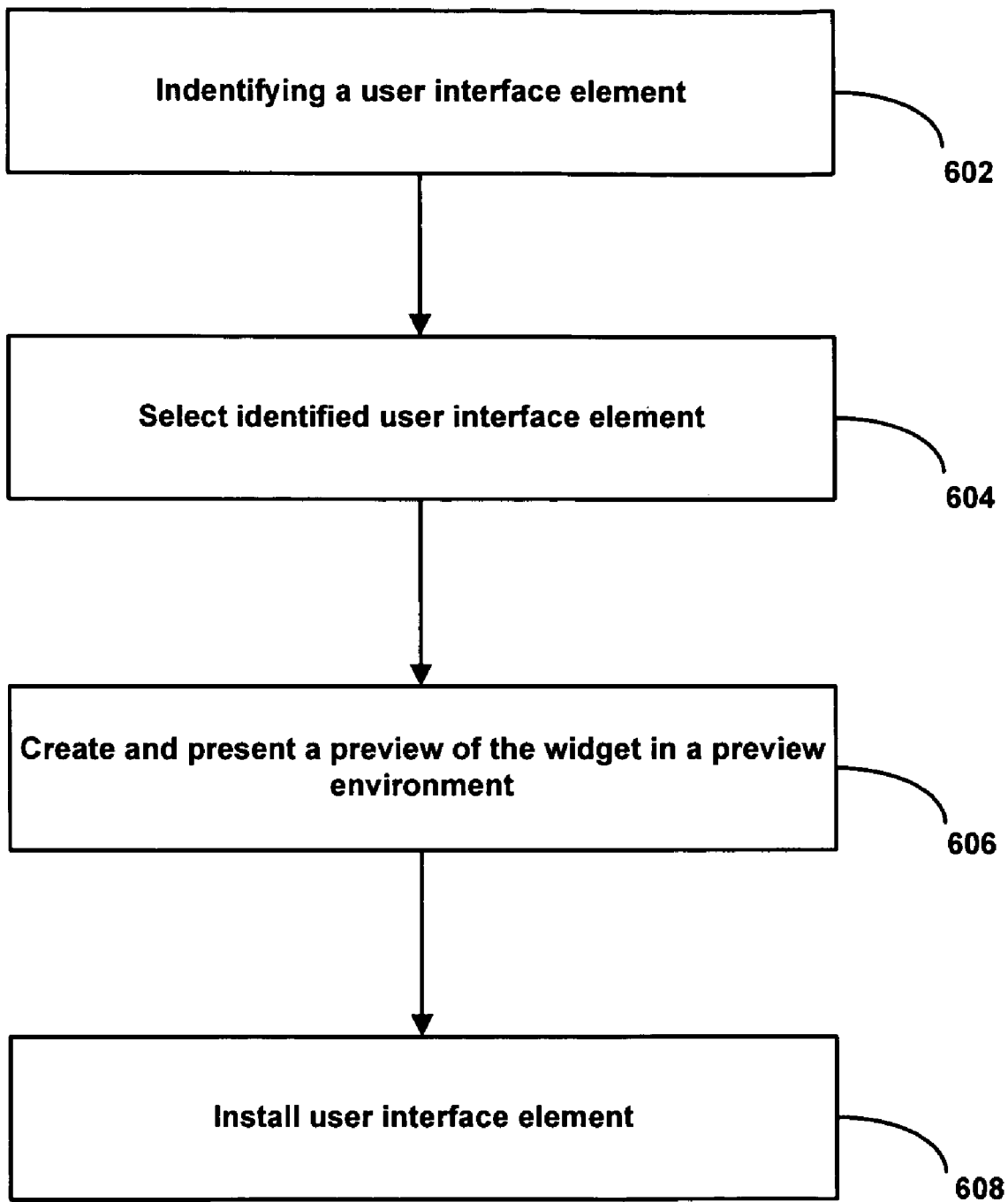
FIG. 6 is a flow diagram of a process for installing a user interface element in a display environment.

FIG. 6 is a flow diagram of a process for installing a user interface element (e.g., a widget) in a display environment. The process includes identifying a user interface element (602). Identifying the user interface element can include locating a widget. Locating can include using a search tool or the like to locate widgets available for installation. Alternatively, other methods can be used for identifying user interface elements for installation including automatic and user controlled identification methods. Available widgets can be presented in a list, e.g., by a management process as is shown below.

After identification, the identified user interface element is selected for installation (604). Selecting a user interface element can include selecting a user interface element from a configuration bar (e.g., configuration bar 408), a widget bar, a tool bar, a menu, an authoring application, or other source. Alternatively, selecting can include dragging or dropping the user interface element onto a display environment (e.g., a dashboard layer), downloading the user interface element from a content source or other source, or other selection process. Selecting can include launching an associated installation process for installing the user interface element, a preview application for previewing the user interface element prior to installation or other application including authoring applications. The launching of the applications can be automatic or user or otherwise selectively controlled.

Upon receipt of the selection, an installation window is presented (e.g., installation window 460). In some implementations, the installation window includes a user interface display portion, a prompt, and one or more interactivity elements. The user interface display portion can include a reference, partial display, or complete (e.g., complete but for the ability to interact, a static display) display of the user interface element that has been selected. The reference (e.g., reference 456) can be a complete reference, a pointer, a designator, a still image, or otherwise that identifies the candidate user interface element for installation. In this way, the user is able to recognize that the selection made corresponds to content (e.g., a widget) that the user desires to install.

The prompt can be of the form of a confirmation to the user of the underlying action (e.g., prompt 458). In one implementation the prompt can be used to confirm a desire to install a named widget. In other implementations, the prompt can be used to confirm not only the named user interface element for installation, but the display environment into which the user interface element will be installed (e.g., "Install named widget #1 on my desktop?" or "Install widget #1 on dashboard #1 of 2?"). In still other implementations, the prompt can include a confirmation of an action (e.g., "install the widget and open it in my dashboard").

The interactivity elements can be of the form of buttons or the like. In one implementation, the installation window includes two interactivity elements including a cancel element (e.g., a cancel button 454), and an installation element (e.g., an installation button 452). Other interactivity elements are possible, including those that link to other associated applications, content sources (e.g., to allow for the selection of a different widget for installation), preview option (e.g., if not automatically previewed) and the like.

Continuing with the method, if a preview option is selected or required (optional), then a preview of the widget in a preview environment is created and presented (606). The creation of the preview environment can include the invocation of a window management engine (e.g., window manager 550) for managing the interaction of one or more windows that make up the preview. In some implementations, the preview includes a presentation window (e.g., presentation window 462) and a preview designator (e.g., preview designator 464) that are separate processes. The presentation window is used to display an instantiation of the selected widget. In some implementations, the display of the presentation window includes an instantiation of the selected widget in a selectable interactive environment. The preview designator is provided to clearly indicate that the preview operation is being performed, as opposed to a conventional direct installation. In some implementations, the preview is presented at a same location in the user interface. Alternatively, if other elements are present at this location, another location or a temporary overlay can be used. In some implementations, the preview designator is a carpet, onto which the presentation window is laid (e.g., layered, overlaid, or the like).

In some implementations, theme content can be presented along with the user interface element in the preview installation window. The theme content can include a theme presentation element that operates as the preview designator (e.g., additional content that is recognized as being part of a preview of an item, for example a preview Title or the like). Other theme content can be presented to preview how the final installed version of the user interface element will appear. For example, assuming a theme border is to be presented with the user interface element at installation, the preview can include the same theme border.

Associated with the preview process may be an authoring or selection process. For example, if the preview displayed is not satisfactory to a user (e.g., the theme content is unsatisfactory), an interactivity element can be presented in the user interface to allow the direct launching of another process (e.g., a search process or application, an authoring application, a selection application or other process or application so that a more appropriate/desirable user interface element can be located/installed) with or without terminating the installation process.

Finally, the user interface element can be installed (608). The installation of the user interface element can include the installation on a tool bar (e.g., a widget bar), in a resource, in a widget manager (e.g., in a list managed by a widget management process) or in a display environment (e.g., directly on a dashboard or the desktop). Installation can include the saving of the underlying content metadata including data structures defining the user interface element in a library or the like. Alternatively, the installation can be part of an underlying application (e.g., directly in an associated dashboard application or a library associated therewith). In some implementations, the installation of the user interface element includes the removal of the preview designator. For example, where a carpet is used to designate the preview, the carpet can be removed for the final installation. In one implementation, the final installation is performed at a same location in the user interface as the preview. In some implementations, an animation or other transition effect can be used when moving from preview to final installed user interface elements. Transitions can include the appearance of pulling of a carpet preview designator from under the user interface element or otherwise making the carpet disappear.

The process steps described can be performed in other orders, repeated or the like to provide desired results. For example, the preview process can be repeated in association with the selection of multiple different user interface elements prior to invoking the installation step.

Once installed, user interface elements can be removed/deleted, enabled and disabled from the display environment as required. In some implementations, a separate deletion process and/or management process is provided from the installation process. Alternatively, the installer process can be invoked to remove/delete and enable/disable user interface elements as required.

In some implementations, deletion includes deactivating the widget but the widget remains installed on the system or device. Alternatively, deletion includes removing the widget completely from the system or device. If a request to delete a widget is received in response to a user action (or programmatically by the operating system or another application), then a message providing the user with deletion options can be presented, enabling the user to determine whether the widget will be deactivated and/or removed from the system or device. In some implementations, the system or device executes a default deletion option which can be changed by the user via a preference pane or other input mechanism, or overwritten by an application or other software component or device (e.g., security engine 544).

Widget Searching

In some implementations, widgets are associated with a widget data type or other metadata to enable a search engine (e.g., Apple's Spotlight® search engine) to search for widgets in files, documents, images, emails, applications, etc. Widgets can be indexed based on data type and/or other metadata. For example, a query can be generated requesting a list of all widgets on a host machine and/other machines on a network. The search engine accesses the index to locate widgets on the host machine and/or other machines on a network.

Widget Manager

As the number of widgets presented in a display environment increases, the need for a tool to organize, and manage widgets (both new and old) arises. In some implementations, a widget manager can be provided to manage installation, access control, security, content control, historical archive, revision, classification, deletion, organization, enablement, placement, importation, exportation, and other functions associated with widgets. With the addition of multiple display environments (e.g., multiple dashboards), the widget manager can provide these and other functions across the multiple display environments to ensure easy of use, flexibility, and customization of each display environment. Below, a number of examples of widget manager instantiations are described. Those of ordinary skill in the art will recognize that the instantiations are exemplary of tools that can be used to enhance the user interface experience and that other variations are possible.

In some implementations, the widget manager is a stand alone application that can be invoked by the user to manage, as described above, widgets. Alternatively, the widget manager can be part of an installer engine as described above, part of an operating system (such as MAC OS X), or a plug in. The widget manager can be a separate process or part of another process executing on an electronic device. The widget manager can be invoked directly, automatically or otherwise as required to allow for interaction with a user. Examples are set forth below with regard to a widget manager and widget manager functions. Those of ordinary skill in the art will recognize that other configurations, including custom configurations based on the device or application, and the like are possible.

In some implementations, a widget manager includes a management engine (similar to management engine 548 discussed above) that is operable to present available widgets in a palette of a user interface display environment, selectively enable or disable each of the available widgets and display enabled widgets in the display environment. In some implementations, the management engine is further operable to locate widgets for installation in the display environment. Location can include locating widgets associated with a given user, display environment or context. Location can include locating widgets for importation from other applications (e.g., e-mail attachments and the like), or from other sources (e.g., web sources). In some implementations, the management engine is further operable to install widgets into the display environment. Accordingly, while reference has been made above concerning one possible implementation where management functions are included in an installer process, other implementations are possible including one where installation functions are included as part of a management process. The display environment can be a user interface of an electronic device.

In some implementations, a widget manager allows users to inspect, remove, enable and disable widgets. The widget manager can be a preference pane or palette, a standalone application or a plug-in, or be part of the installer process described above. The widget manager displays widget information, including but not limited to the widget's title, author, version, class, type, ratings, description, etc. The information can be displayed in any order and format according to one or more sorting criteria, such as alphabetical or chronological order, author, class, rating, etc. In some implementations, the widget manager tracks widget updates and automatically notifies the user or host system or device when an update is available.

In some implementations, the widget manager allows users to perform certain actions on widgets, including but not limited to copying, moving, deleting, uninstalling, deactivating, enabling, disabling, renaming, previewing, etc. In some implementations, the widget manager includes functionality that allows the import and export of widgets to and from various widget sources (e.g., network, email, CD ROM, etc.). For example, widgets can be imported and exported to and from a web site that can be accessed by multiple users. In some implementations, the widget manager includes a search field that allows users to search for widgets on a host system or device, and/or one or more networked devices.

In some implementations, the widget manager can be invoked by a button or other input mechanism located in a user interface (e.g., desktop, system tray, dashboard, configuration bar, etc.). For example, when the button is activated, the widget manager is launched and a user interface is displayed. In_some implementations, the widget manager is a widget itself and includes at least some characteristics, attributes or properties of other widgets. For example, the widget manager can be enabled or disabled, resized, dragged and dropped, flipped to reveal special options or preferences, etc.

In some implementations, the widget manager can be displayed in a format that is consistent with a dashboard theme or content. The appearance_and/or properties of the widget (e.g., colors, styles, fonts, etc.) can be changed by a user via a preference pane or other input mechanism.

Example User Interface for a Widget Manager

Figure 7A:
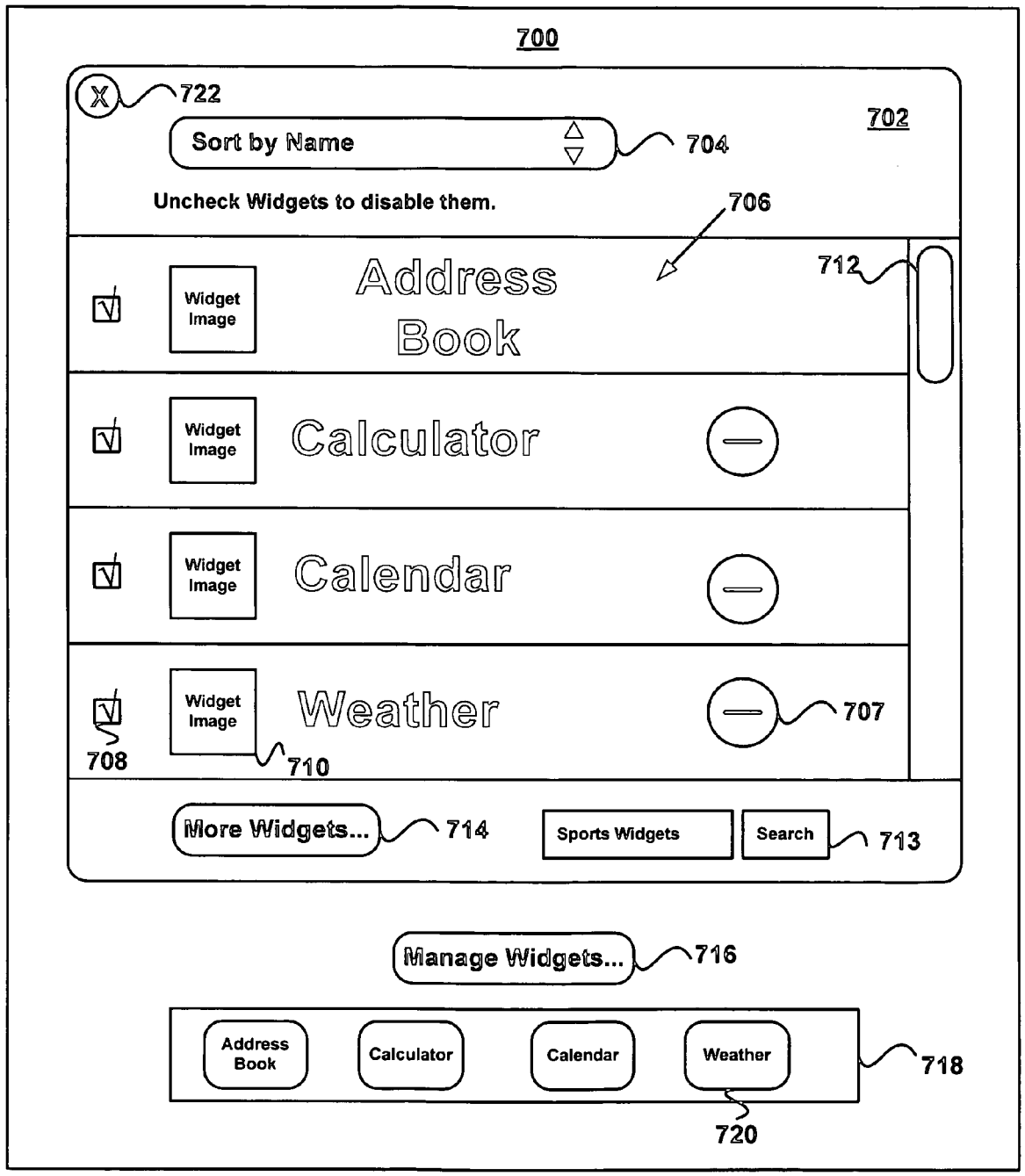
FIG. 7a illustrates a user interface for a widget manager.

FIG. 7a illustrates a user interface 702 for a widget manager. It should be apparent that a user interface for a widget manager can include more or fewer features than shown.

In some implementations, the user interface 702 is displayed in another user interface 700 (e.g., a desktop or dashboard) in response to user input. User input can include, for example, clicking on a button 716 (e.g., a "Manage Widgets" button) or other input mechanism located in the user interface 700. The user interface 702 can be dismissed by clicking on button 722 or other input mechanism.

In some implementations, the user interface 702 includes a scrollable list 706 of widget names and/or other attributes which correspond to widgets that have been installed on the host system. Double clicking on the name of a widget (or an associated icon or button) launches the widget. In some implementations, the scrollable list 706 includes widgets that reside on the host system but have not been installed (e.g., widgets downloaded to a desktop). This implementation enables users to install or launch widgets from within the widget manager. In some implementations, the list 706 includes names of widgets that reside on another device coupled to the host system via a network connection. In some implementations, a search history is maintained to enable the user to refine search terms and/or re-run a previous search. In some implementations, an event history is maintained which allows users to undo and redo previous widget operations.

Optionally, next to each widget is an icon image 710 associated with the widget that can be used to identify the widget and assist the user in selecting the widget from the list 706. Widgets that are selected to be hidden (e.g., based on a "hide widget" option provided in the widget manager) will not be shown in the list.

The widgets can be scrolled using, for example, a scroll bar 712. Users can also toggle each widget on and off (i.e., enable/disable the widget) by selecting a checkbox 708 located to the left of each widget listing. Similarly, on the right side of some widget listings is a button 707 or other input mechanism that allows users to delete the widget. Note that for this example, widgets that cannot be deleted do not have a corresponding button 707. In some implementation, default widgets or widgets that have been locked may not be deleted.

In some implementations, the user interface 702 includes a menu 704 (e.g., located at the top of the user interface 702) of sorting options that will sort the widget list 706 by name, date, author, rating or any other sorting criteria. In some implementations, the menu 704 includes an option to sort widgets based on whether the widgets are enabled or disabled.

In some implementations, a button 714 (e.g., a button labeled "More Widgets . . . ") displays more widgets and a search button 713 allows a user to search for more widgets located in local directories or on one or more network devices (e.g., a website) using known search technologies. For example, the user can enter the query "Sports Widgets" in a search box and click the button 713 to initiate a search for Sports Widgets.

In some implementations, when a widget is enabled (check box 708 is checked) the widget's icon image 720 is displayed in a configuration bar 718 in user interface 700. For example, since the check box 708 associated with the "weather widget" is checked, its icon image 720 is displayed in the configuration bar 718 in user interface 700. Similarly, if the check box 708 is unchecked, then the image icon 720 is not displayed or otherwise deemphasized in the configuration bar 718 or its appearance is altered (e.g., grayed out, darkened, made translucent, etc.) to indicate to a user that the widget is disabled.

Figure 7B:
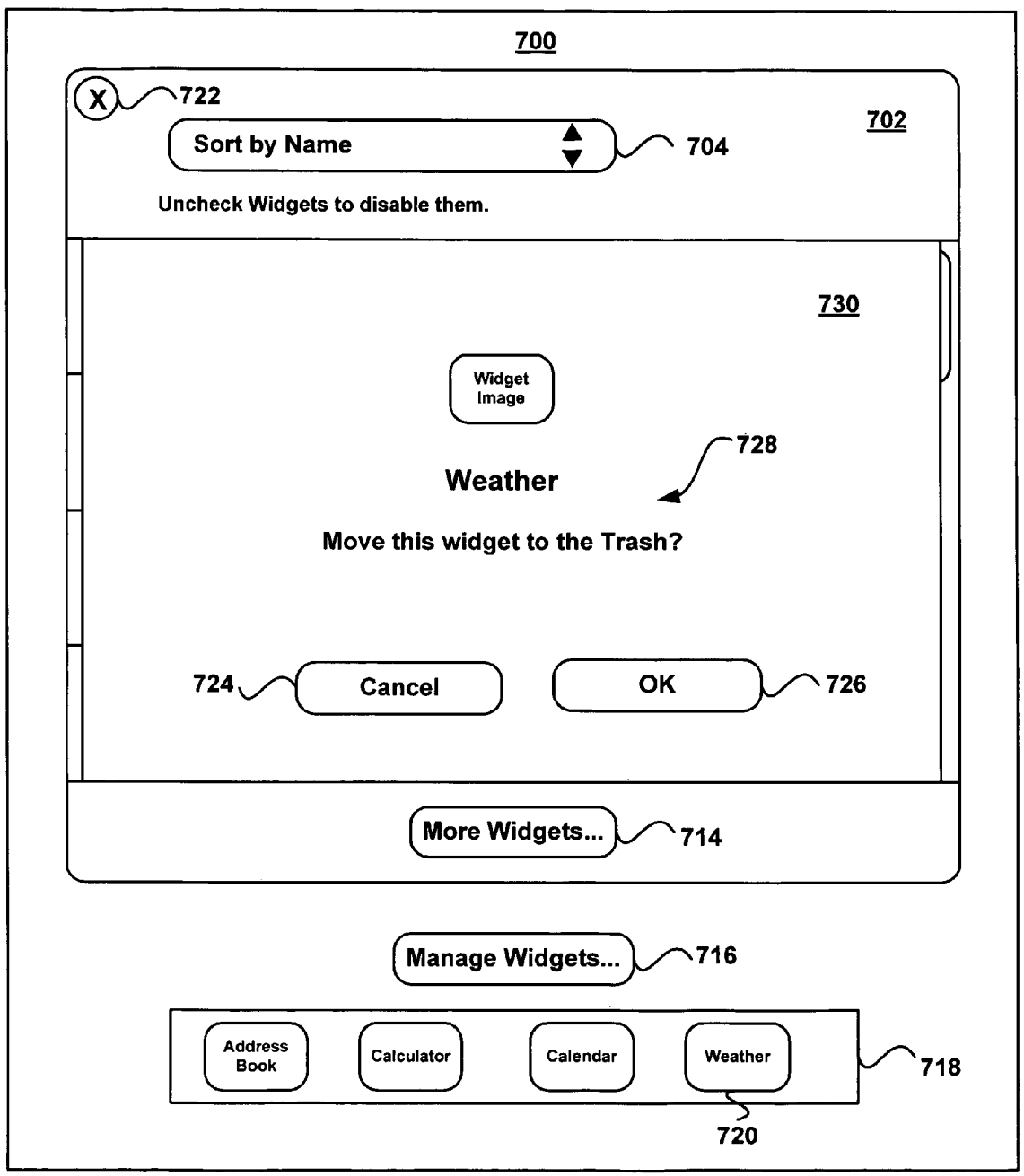
FIG. 7b illustrates a widget manager confirmation panel associated with deletion of a widget.

FIG. 7b illustrates a widget manager overlay 730 for requesting a user to confirm the deletion of a widget. In some implementations, when clicking the delete button 707 (FIG. 7a), a semi-translucent overlay 730 appears within the user interface 702 including a message 728 requesting the user to confirm their intent to delete the widget. For example, the message 728 could be "Move this widget to the Trash?" The user can respond to the message 728 by clicking a button 726 ("OK"), which results in the widget being moved to the "Trash" or otherwise deleted from the host system. The user can also respond by clicking a button 724 ("Cancel"), which results in the deletion operation being terminated. If a widget is moved to the "Trash" or otherwise deleted, then its icon image 720 is removed from the configuration bar 718 and list.

Simple Widget Management

Figure 7C:
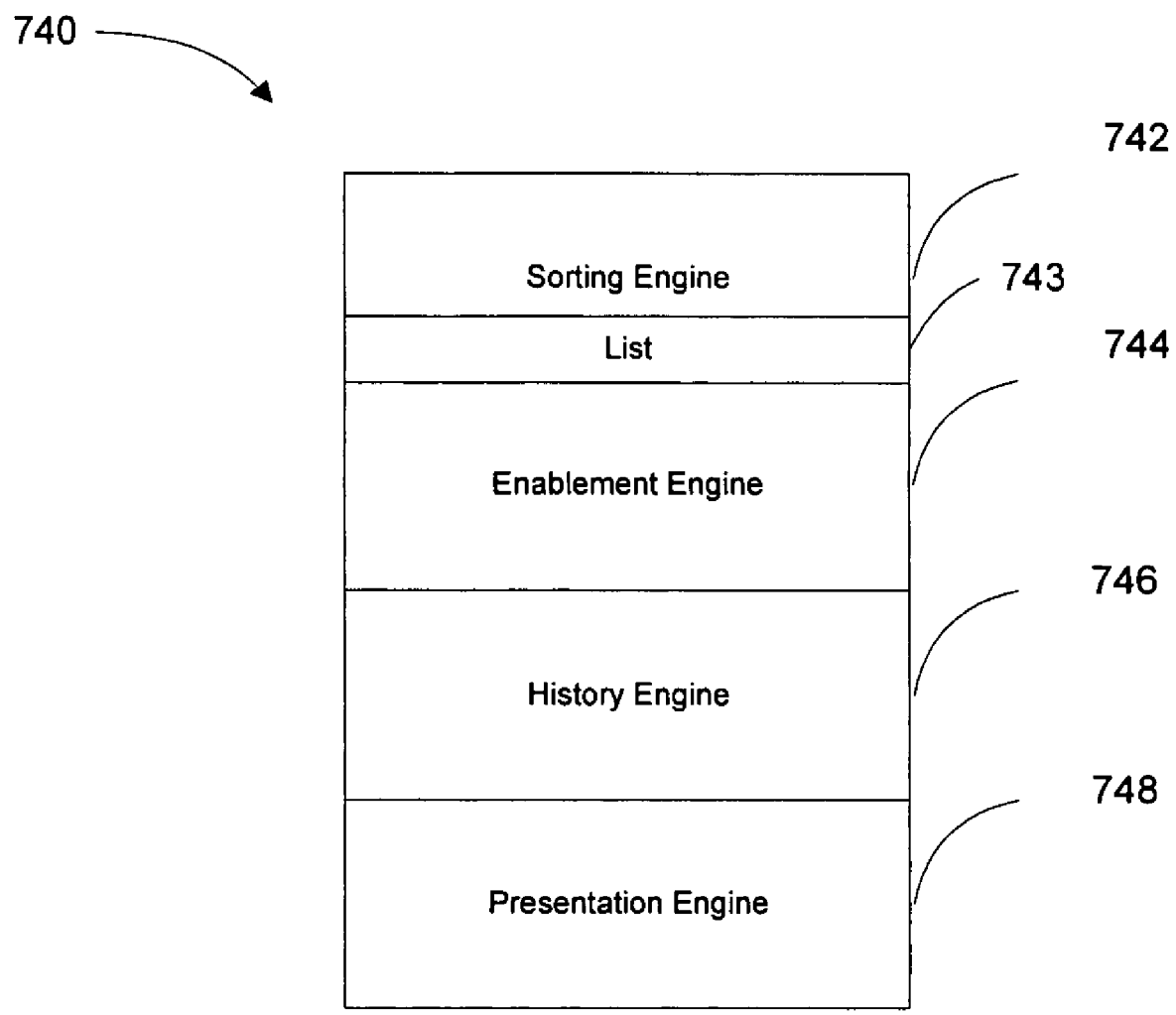
FIG. 7c is a block diagram of a widget manager process.

Referring now to FIG. 7c, in one implementation, the widget manager 740 is a process that includes a sorting engine 742, enablement engine 744, a history engine 746 and a presentation engine 748. The widget manager 740 can be a separate computer process, part of an application, or part of the operating system in a computing environment. Though reference has been made that separate engines are provided, the functions of one or more engines can be combined into a single engine or process. For the purposes of clarity of the disclosure, separate engines are described. Other instantiations are possible.

Sorting engine 742 maintains a list 743 of available widgets, in for example a database (not shown). Sorting engine 742 can be used to sort the entries in the list 743, and present the entries in particular orders based on one or more user sort criteria. In one implementation, the list 743 can include information for each widget. The information can be directly or indirectly associated with the widget. For example, information relating to the name, origin, date, version, type (e.g., type of widget selected from clipviews, webviews, accessories, etc,) and other directly related information can be stored in the list 743 or associated with a given widget. Sorting engine 742 can be used to sort the entries in the list 743 to provide a sorted list for presentation by the presentation engine 748 to a user. Other information including historical access data, preferences, and the like can be stored and used as sort criteria. For example, sorting engine 742 can include a separate or integrated process for gathering statistics regarding the use of widgets (most popular, most often accessed, most often accessed in a given context, most recently accessed, and the like). The statistical metadata can be stored in the list 743. Sorting can be invoked by a keystroke, command, automatically based on preferences, or otherwise with user interaction. Sorting is discussed in greater detail below.

Enablement engine 744 is a portion of the manager process that controls which widgets will be provided in a given display environment. Enablement engine 744 receives input from the user either directly or via preferences, to selectively enable ones of the available widgets in a given display environment. Where there is but a single display environment, enablement engine 744 is used to enable selected ones of the available widgets in the display environment. In a multiple display environment setting, enablement engine 744 can be used to selectively enable ones of the available widgets in each of the display environments. Associated with each available widget can be enablement metadata. The enablement metadata can be stored in list 743. The enablement metadata can define the conditions (e.g., display environment, or other conditions) which must be satisfied in order to allow the widget to be displayed in a given display environment. Enablement engine 744 can at the time of launch, or installation of a display environment (e.g., a dashboard), evaluate the enablement data, and enable selected widgets in the display environment.

History engine 746 can be used to maintain historical information relating to widgets in, for example, list 743. Historical information can include use data, snapshot data (reflecting a state of the widget at a given time), version information, statistical information and the like. History engine 746 can be used to review the historical information, reconstruct a historical event (e.g., reconfigure a widget to a default state) or otherwise.

Presentation engine 748 provides a user interface for the widget manager 740. The presentation engine 748 can provide a complete presentation, or one modified based on the display environment. Details of the operation of the presentation manager 748 are discussed below.

Figure 7D:
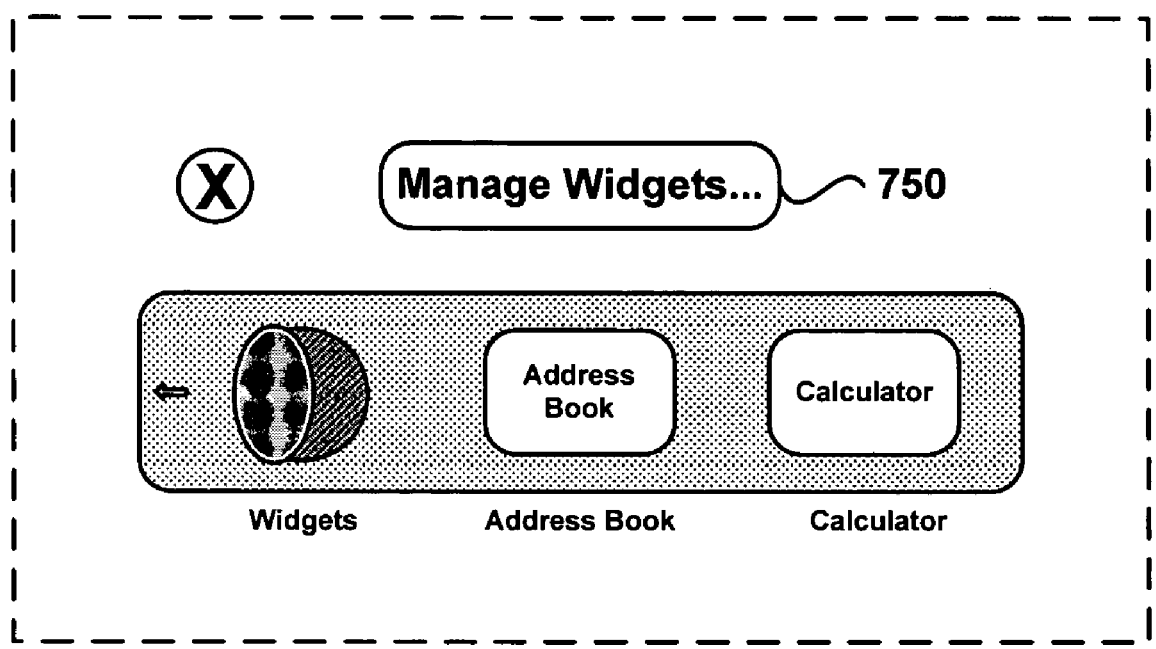
FIG. 7d illustrates a user interface for invoking a widget manager.
Figure 7E:
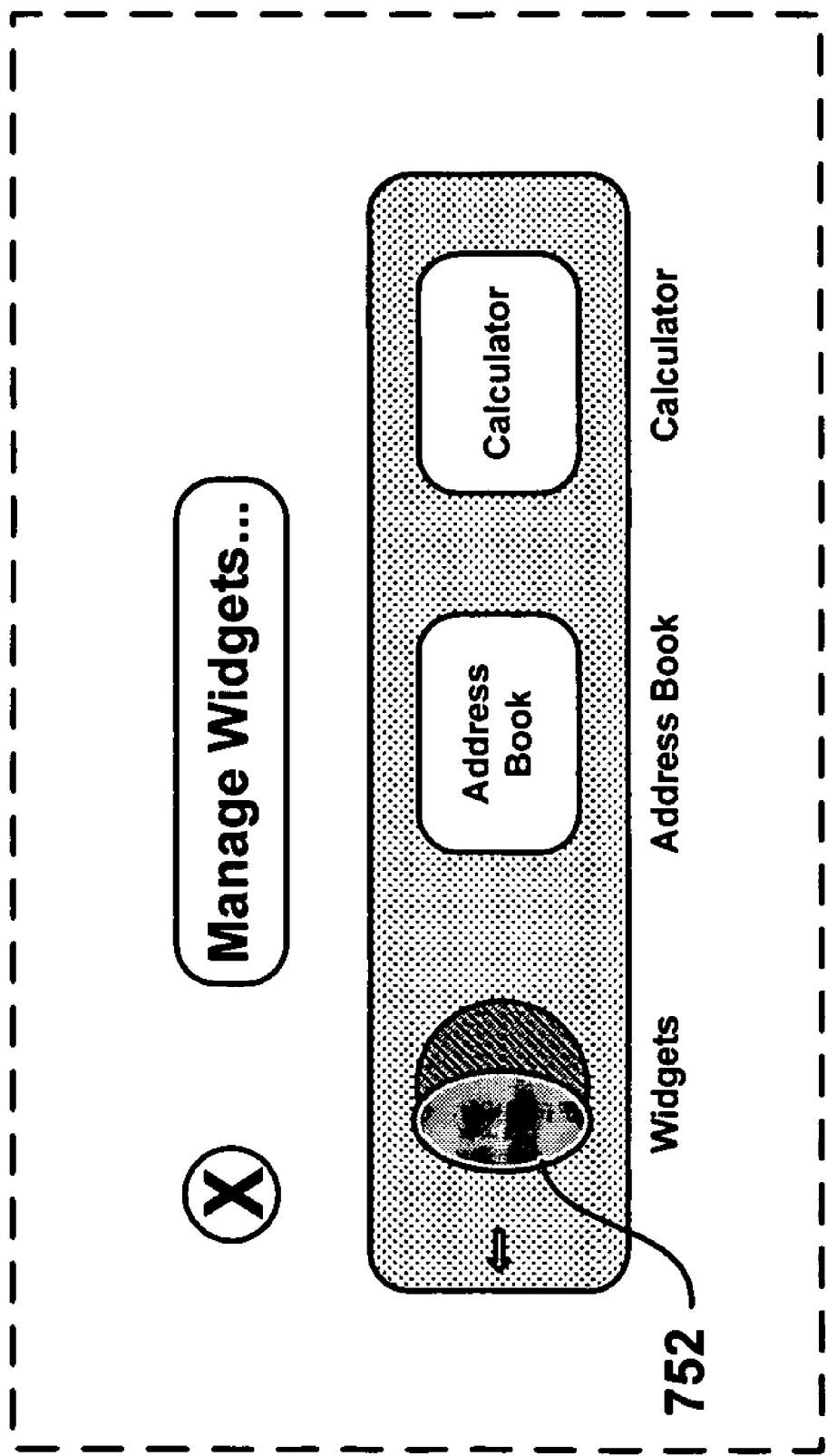
FIG. 7e illustrates an alternative user interface for invoking a widget manager.

In one implementation, the widget manager 740 can be accessed by a keystroke or other command from, for example, the user interface. In one implementation, as shown in FIG. 7d, the widget manager can be invoked using a button 750 that is located on the user interface, in the example shown, above a configuration bar. In one implementation, the widget manager 740 is itself a widget that is presented in the configuration bar, in a display environment or otherwise that can be activated by user input. For example as shown in FIG. 7e, the widget manager 740 can be invoked by selecting (e.g., clicking) the widget icon 752 in the configuration bar (e.g., previously referred to as the Widget Bar).

Figure 7F:
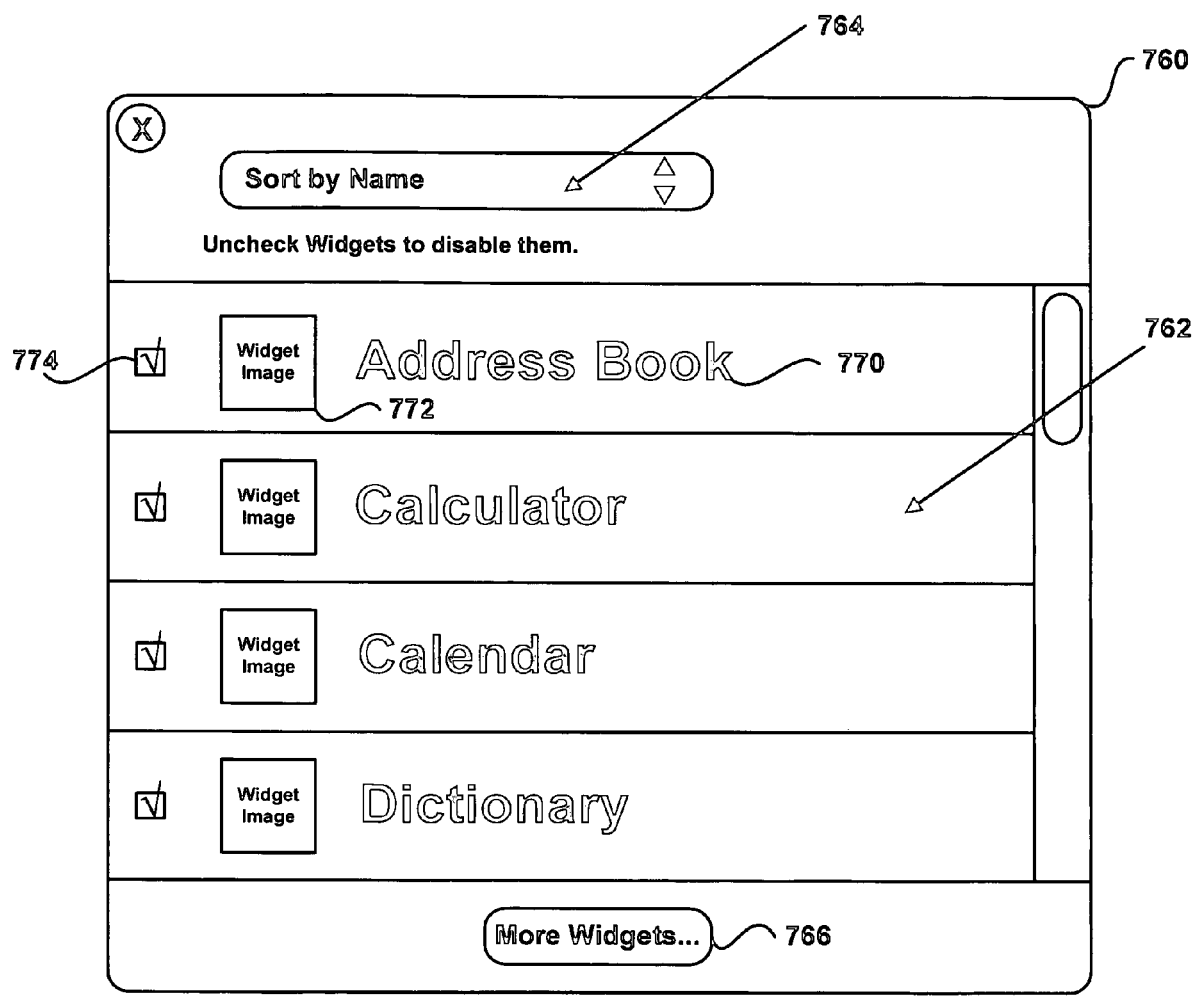
FIG. 7f illustrates a user interface for a widget management window.

After invocation, a widget management window 760 is presented in the user interface (e.g., by the presentation engine 748) as shown in FIG. 7f. In some implementations, a full management window is presented. In display environments that are limited by resources, in hardware, software, size or otherwise, a reduced widget management window may be presented. The reduced widget management window can be smaller in size, display less information, or otherwise be optimized to the limited resource environment in which it is displayed. In the implementation shown, widget management window 760 includes a list of widgets 762, and a plurality of input mechanisms (e.g., sort menu 764 and more button 766). Though reference is made to a button, other forms of activating tools are possible including scripts, windows, bars, or other user interface elements. The term button is used generically, and can be accomplished by a variety of means by those of ordinary skill in the art.

Widget list 762 can include a name 770, an icon or image 772, and an enable button 774. In one implementation, the widget list 762 is associated with a list of available widgets (e.g., list 743) that is maintained by the widget manager 740. The list can be maintained in memory associated with the widget manager 740, and called to populate the widget list 762 as required. Alternatively, the widget list 762 can be unique to the user, and represent a subset of the available widgets in the list 743. The determination of which widgets to present can be made based on criteria associated with the user, context or display environment. The name 770 can be the name of the widget, other metadata associated with the widget (e.g., a pointer to a location in memory where the widget is stored, metadata relating to when the widget was installed, where it was installed, what version number, the source of the widget, etc.). Icon 772 can be a representation associated with the widget. The representation can provide a visual clue to the operation of the associated widget (e.g., a calendar widget could have an associated calendar representation). Enable button 774 can be used to selectively enable available widgets in the display environment. Selection of the enable button associated with a given widget marks the widget for enablement at invocation of the display environment. Enable button 774 can be of the form of a check box as described above. Marked widgets can be invoked in the display environment by, for example enablement engine 744. Unmarked widgets can be hidden, not displayed, not installed or otherwise disabled in the display environment at invocation. In one implementation, the widget list 762 can be sorted to show those items that are enabled versus those disabled. Enablement can be controlled by the user, by an administrator, using content guards or filtering technologies as required. For example, widget manager 740 can include a filter that automatically disables ones of the widgets that would otherwise be available based on a criteria (e.g., parent control criteria, access control criteria or otherwise). In one implementation, enablement engine 744 controls access, and hence enablement for individual widgets.

Figure 7G:
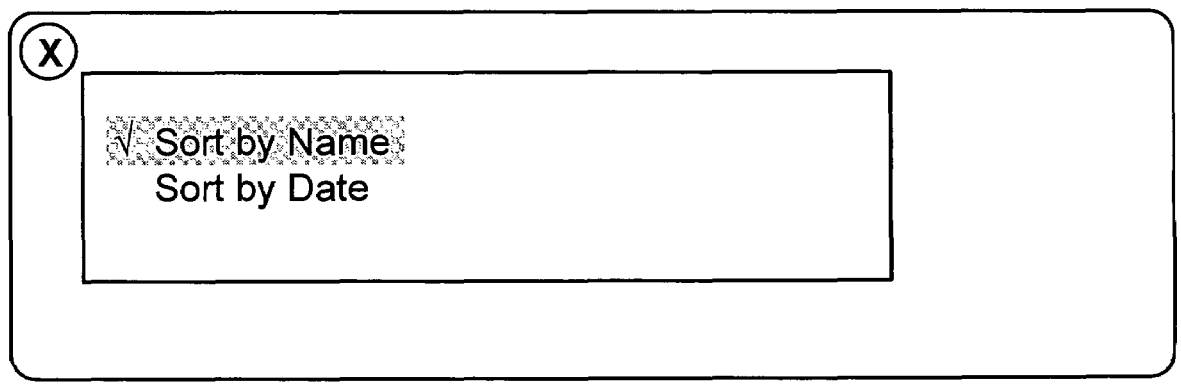
FIG. 7g illustrates a user interface for use in sorting widgets.

Sort button 764 can be used to sort widget list 762 in the presentation window. Sort button 764 can include a sort criteria selection for defining the sort criteria. The sort criteria can be provided by the user. Alternatively, the sort criteria can be inferred. In one implementation, the sort button 764 can include a plurality of sort options, presented, for example as pull down selections when the sort button is activated as shown in FIG. 7g. Exemplary sort options include sorting alphabetically, by type, source, preference, use, context, and the like, and sorting automatically based on user provided criteria.

More button 766 can be invoked to display lists, locations (e.g., web locations), stores, suppliers, or otherwise associated with widgets. In one implementation, more button 766 can be a link to a hosting site that provides widgets available for download. When invoked, more button 766 displays additional widgets that are available for installation, or can be used as a browser to locate available widgets.

Figure 7H:
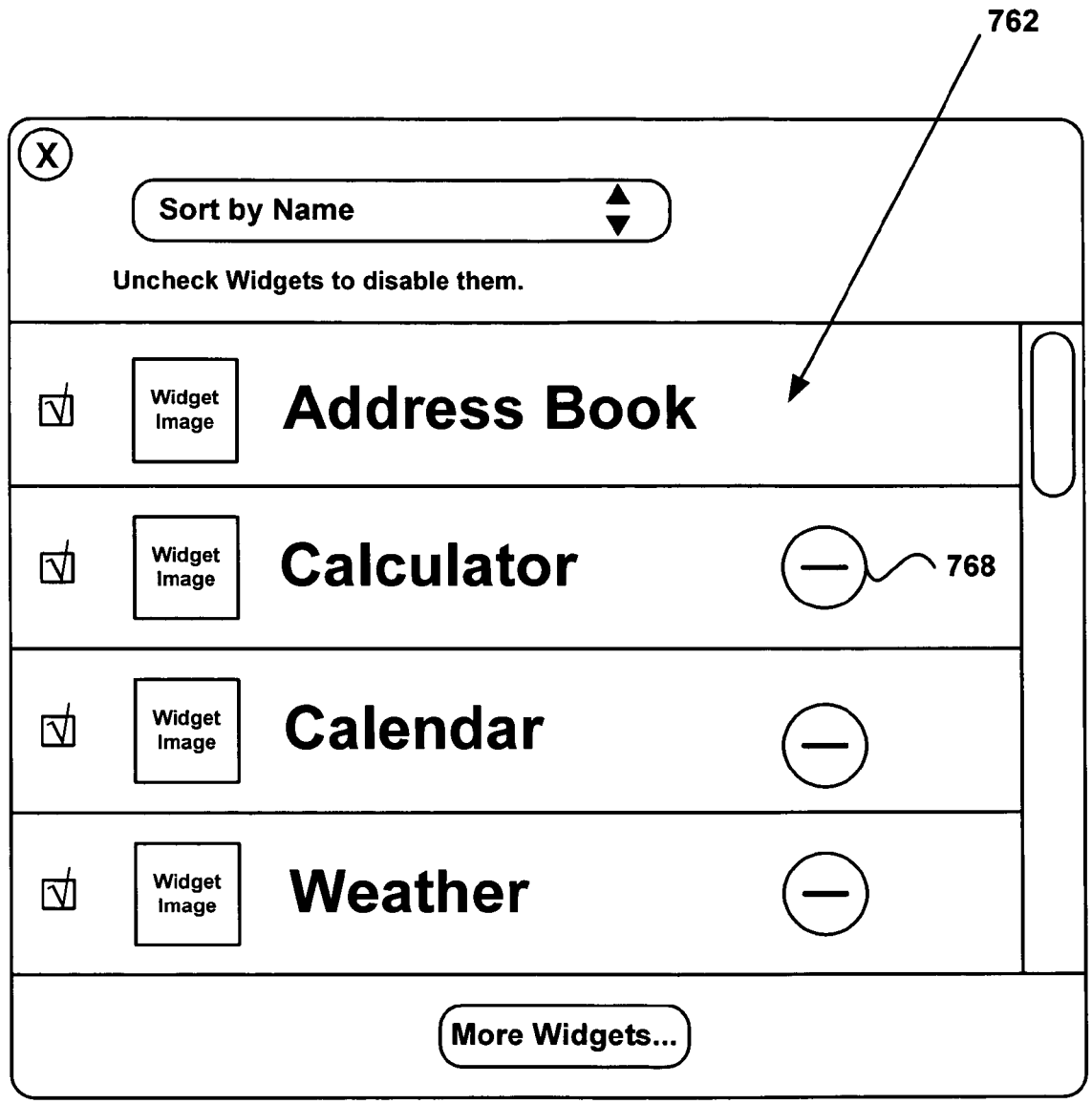
FIG. 7h illustrates an alternative user interface for a widget management window.
Figure 7I:
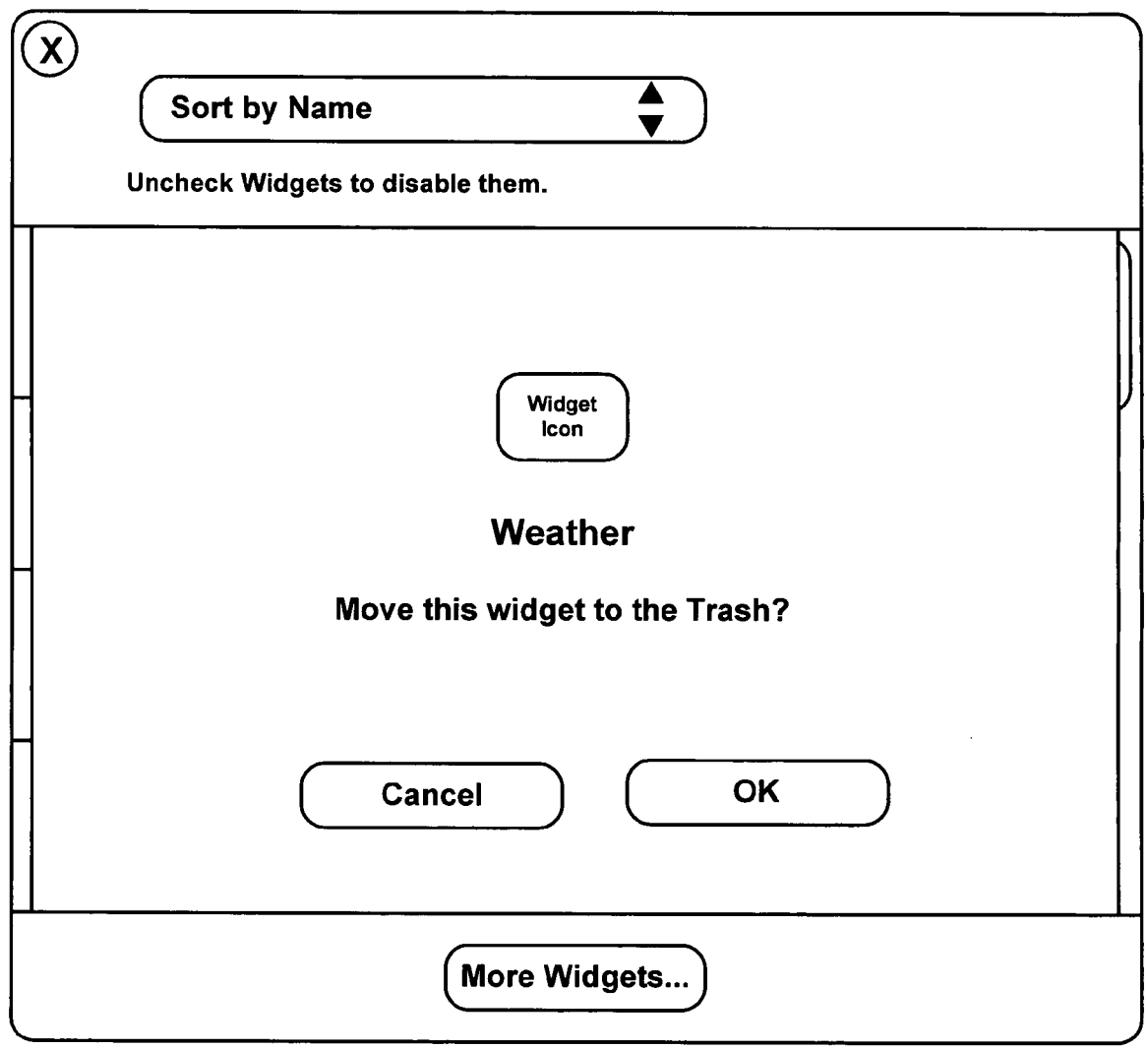
FIG. 7i illustrates a user interface for deleting widgets.

An alternative implementation for a management window is shown in FIG. 7h. In the implementation shown, one or more entries in the widget list 762 include an additional button or activatable feature. In the implementation shown, a delete button 768 is included in the user interface. The delete button 768 (shown as a minus sign in one implementation) can be used to remove the widget from the management environment and the computing environment as required. In one implementation, selection of the deletion button 768 provides a prompt to the user to confirm that the widget is to be removed from the widget manager as shown in FIG. 7i. In one implementation, the widget can be removed from the widget manager list of available widgets and software associated with the widget can be made available for removal (e.g., placed in the trash). In other implementations, a deleted widget is only removed from the management window, and not removed from the computing/display device. In one implementation, only authorized users are able to delete widgets (e.g., an administrator or user with administrator privileges).

Widget Management Including Sorting and Enablement

Figure 7J:
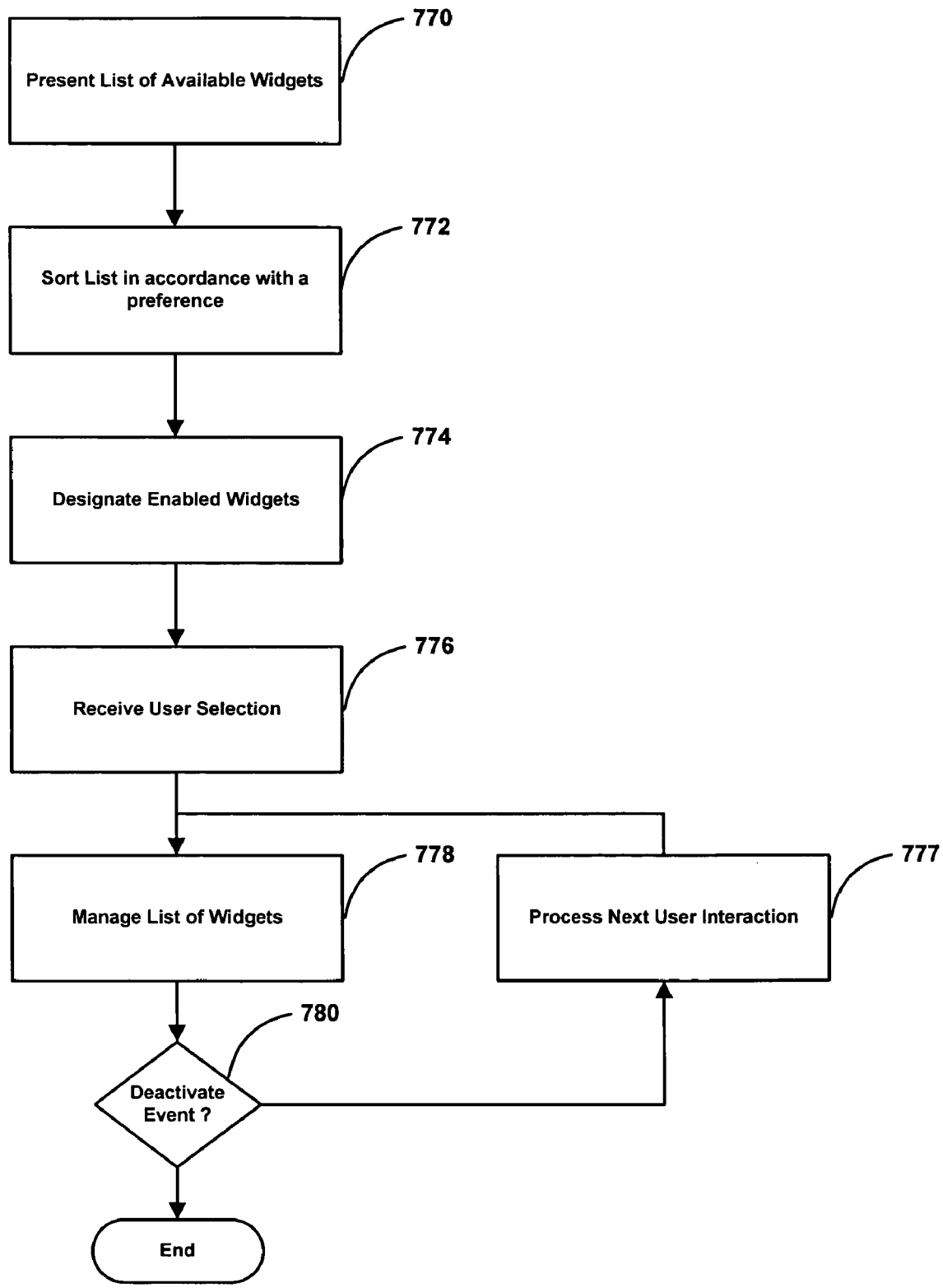
FIG. 7j shows a method for managing widgets.

Referring now to FIG. 7j, a method is described for managing widgets in a display environment. At invocation, prompt, or otherwise, a list of available widgets is presented in the display environment 770. The list of available widgets can be drawn from a file of widgets stored on the device. At the time of presentation, the list is sorted in accordance with a user preference or with default preferences 772. Enabled widgets can be designated in the presentation 774. A user selection for sorting, enabling, disabling, or otherwise manipulating the list can be received 776. Otherwise manipulating can include viewing information associated with one or more of the widgets in the list. Responsive to the user selection, the list can be managed to reflect the user selection including enabling, disabling, deleting or otherwise processing the widgets in the list 778. Other user selections can be processed 777 until a deactivation event is sensed 780. At deactivation, the list can be stored including any changed data for future retrieval.

Widget Management Including Instantiation of Widgets

Figure 7K:
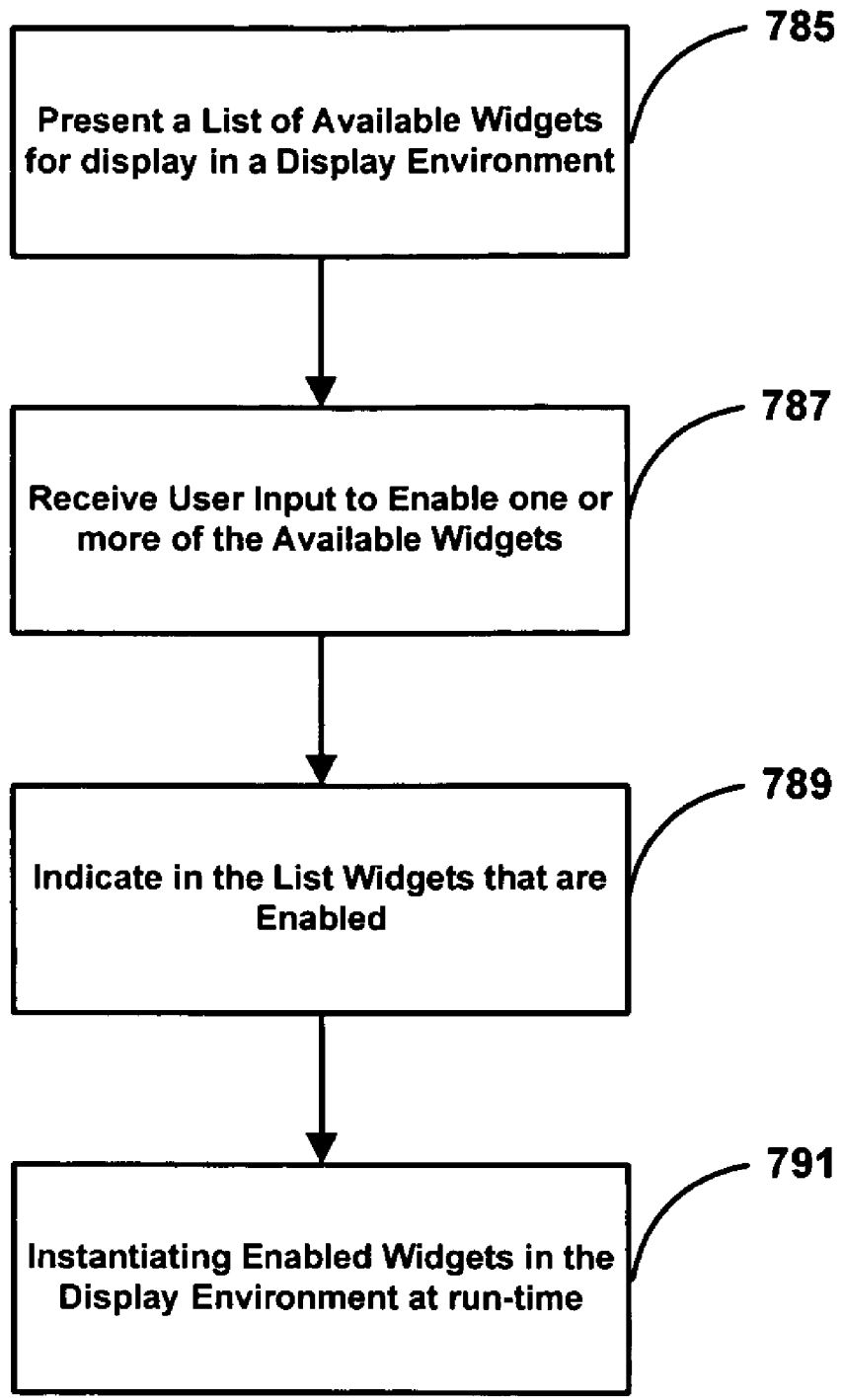
FIG. 7k shows an alternative method for managing widgets.

Referring now to FIG. 7k, in one implementation, a method of managing widgets for display in a display environment includes presenting a list of available widgets 785 and receiving user input to enable one or more widgets to be displayed in the display environment 787. The method includes indicating in the list which widgets are enabled and to be displayed in the display environment from the available widgets 789. At run time, the method includes instantiating each enabled widget in the display environment 791. Presenting the list of available widgets can include presenting a link to a location where widgets can be downloaded and sorting the list. Presenting can also include indicating in the list which widgets are disabled and will not be displayed at run time.

Widget Management Including Usage Criteria Presentation

Figure 8A:
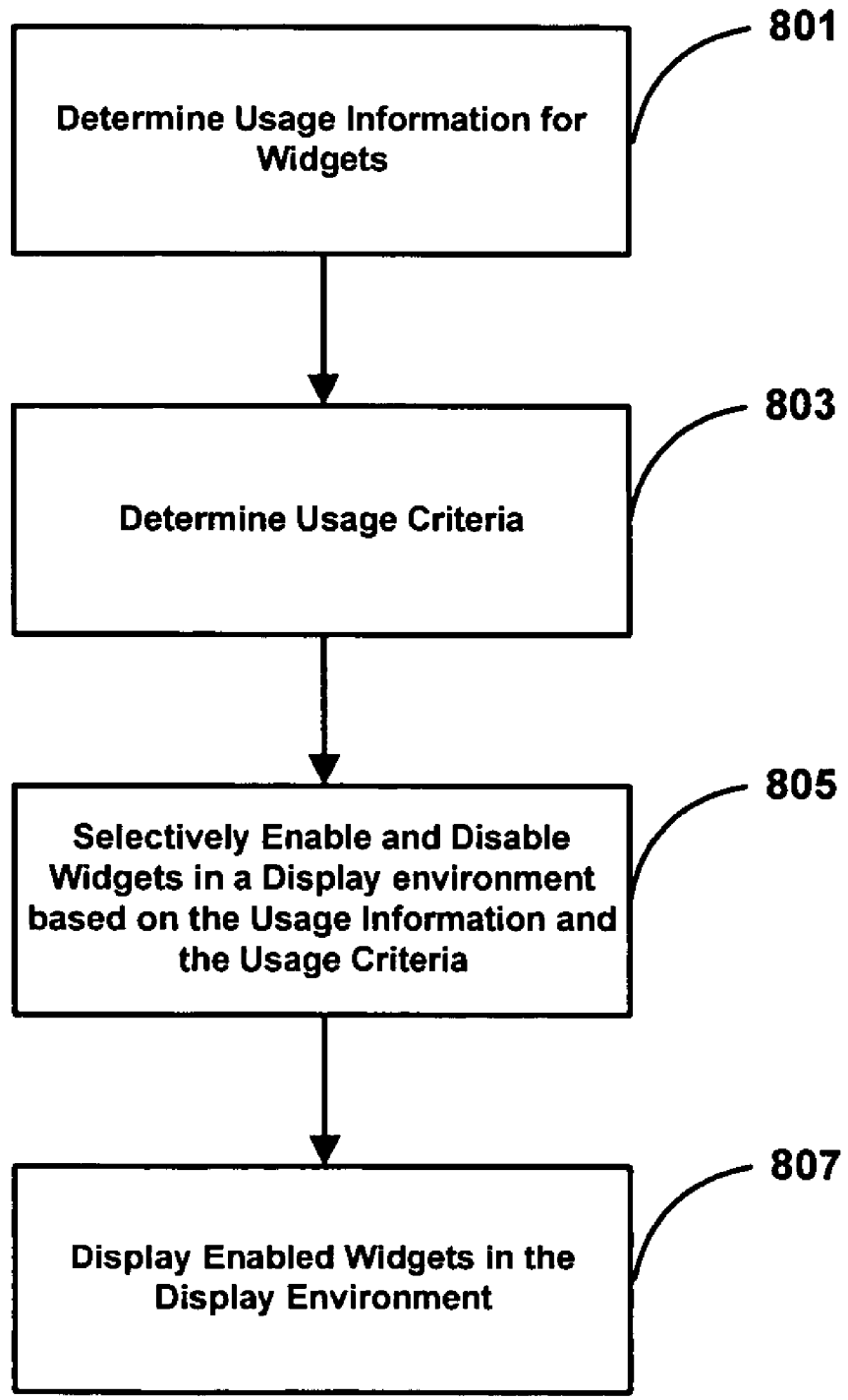
FIG. 8a shows an alternative method for managing widgets.

Referring now to FIG. 8a, in another implementation, a method of managing widgets for display in a display environment includes determining usage information for widgets when displayed in a display environment 801 and determining usage criteria associated with the presentation of widgets in the display environment 803. The method includes selectively enabling and disabling at least one widget from the available widgets based on the usage criteria and the usage information 805 and displaying enabled widgets in the display environment 807. Usage information can be related to a single user or to a plurality of users. For example, the usage information can include usage statistics relative to the individual user, or a pre-defined group of users. In one implementation, the usage information includes an indication of when a given widget was last activated. The usage criteria can define how to use the usage information. For example, in one implementation, the usage criteria can include information on how often the usage information is to be evaluated.

Widget Management Including Enabling a Subset of Widgets

Figure 8B:
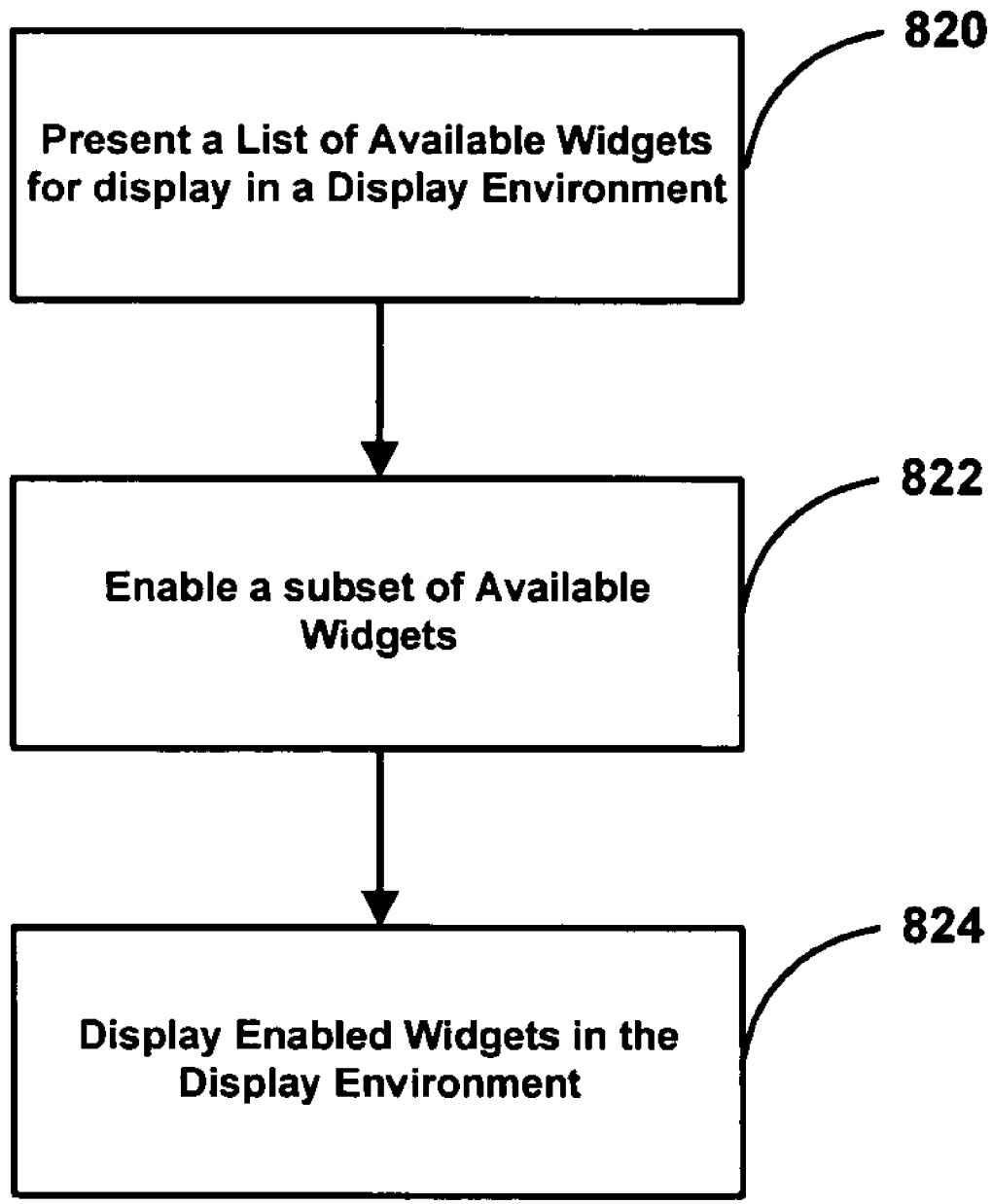
FIG. 8b shows a method for managing a subset of widgets.

Referring now to FIG. 8b, in another implementation, a method is provided for managing a subset of widgets in a given display environment. The method includes presenting a list of available widgets in a user interface 820, enabling a subset of the available widgets 822 and displaying the subset in a display environment of the user interface 824. The method can include selecting a widget from the list of available widgets and sending the widget to another user. Sending can include sending the widget using a transfer protocol (e.g., mail protocol or a file transfer protocol). The method can include storing a copy of at least one enabled widget to guard against file corruption. The method can further include downloading a widget from an external source and installing the downloaded widget. Installing the downloaded widget can include previewing the downloaded widget in a display environment. Downloading the widget can also include determining user privileges including classification privileges, determining a type of the widget and enabling the download only if the classification privileges allow downloading of widgets of the determined type.

The method can include selectively controlling user configuration of available widgets including controlling one or more of enabling, editing, removing, or disabling widgets. The method can include storing historical configuration data for one or more of each widget or a selected subset of widgets.

Widget Management Including Privilege Processing

Figure 8C:
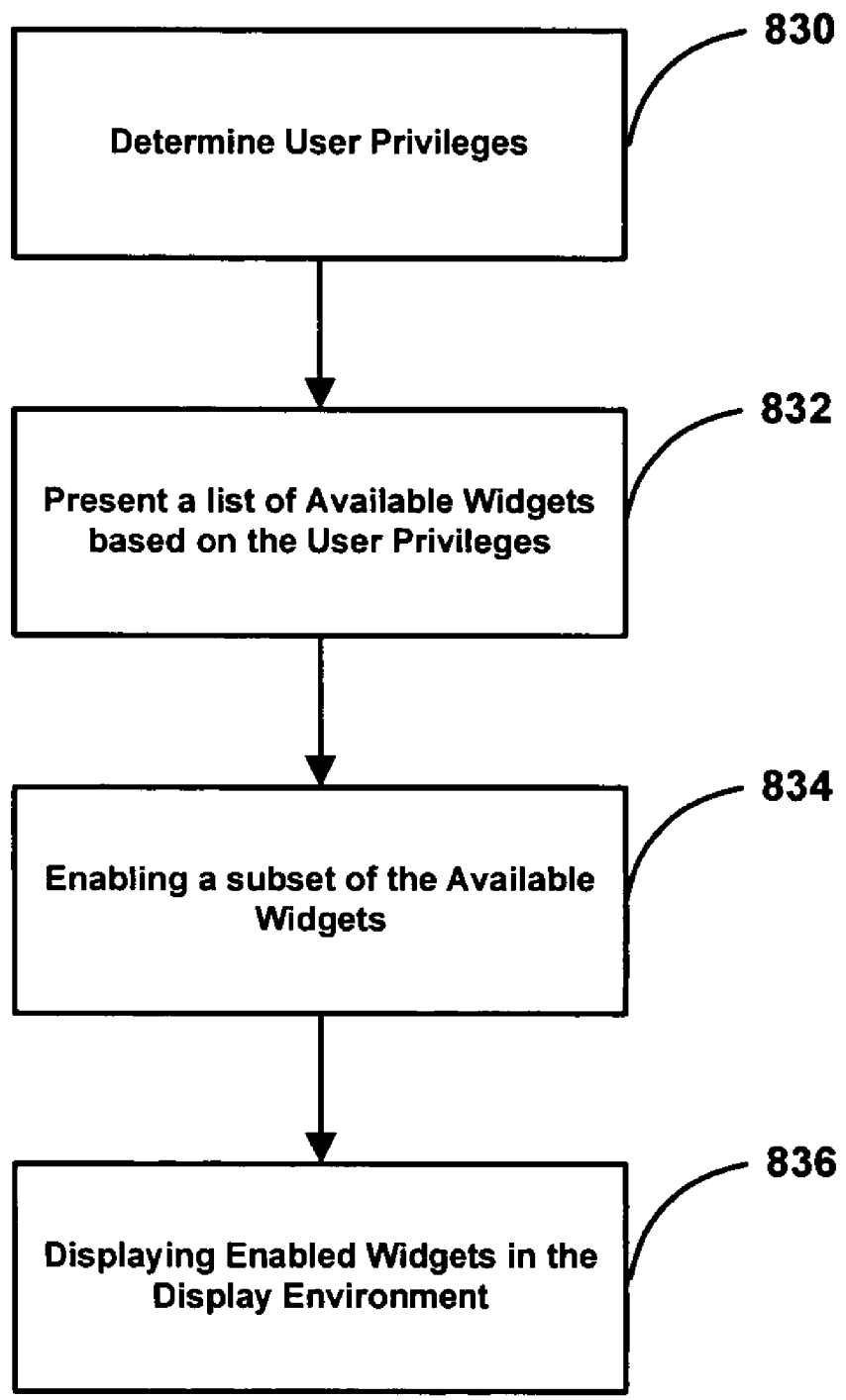
FIG. 8c shows a method for managing widgets including privilege processing.

Referring now to FIG. 8c, in one implementation, a method of managing widgets includes privilege processing. Privilege processing as used herein, refers to consideration of the privileges associated with a given user to make presentation decisions relative to the number, or kind of widgets that are available for instantiation in a display environment. The method includes determining user privileges 830, presenting a list of available widgets based on the user privileges 832, enabling a subset of the available widgets based on user privilege 834 and displaying enabled widgets in a display environment 836.

Determining user privileges can include authenticating the user. The method can further include loading of a new widget for display, verifying privileges of the user prior to display of the new widget and selectively enabling or disabling display of the new widget based on the user privileges. Presenting a list of available widgets can include determining a type of each widget and making available only widgets having types that are consistent with the user privileges. The type can be based on content displayed by the widget. Presenting a list of available widgets can include rating each widget and making available only those widgets having ratings that are consistent with the user privileges.

Widget Management Using Classification Data

Figure 8D:
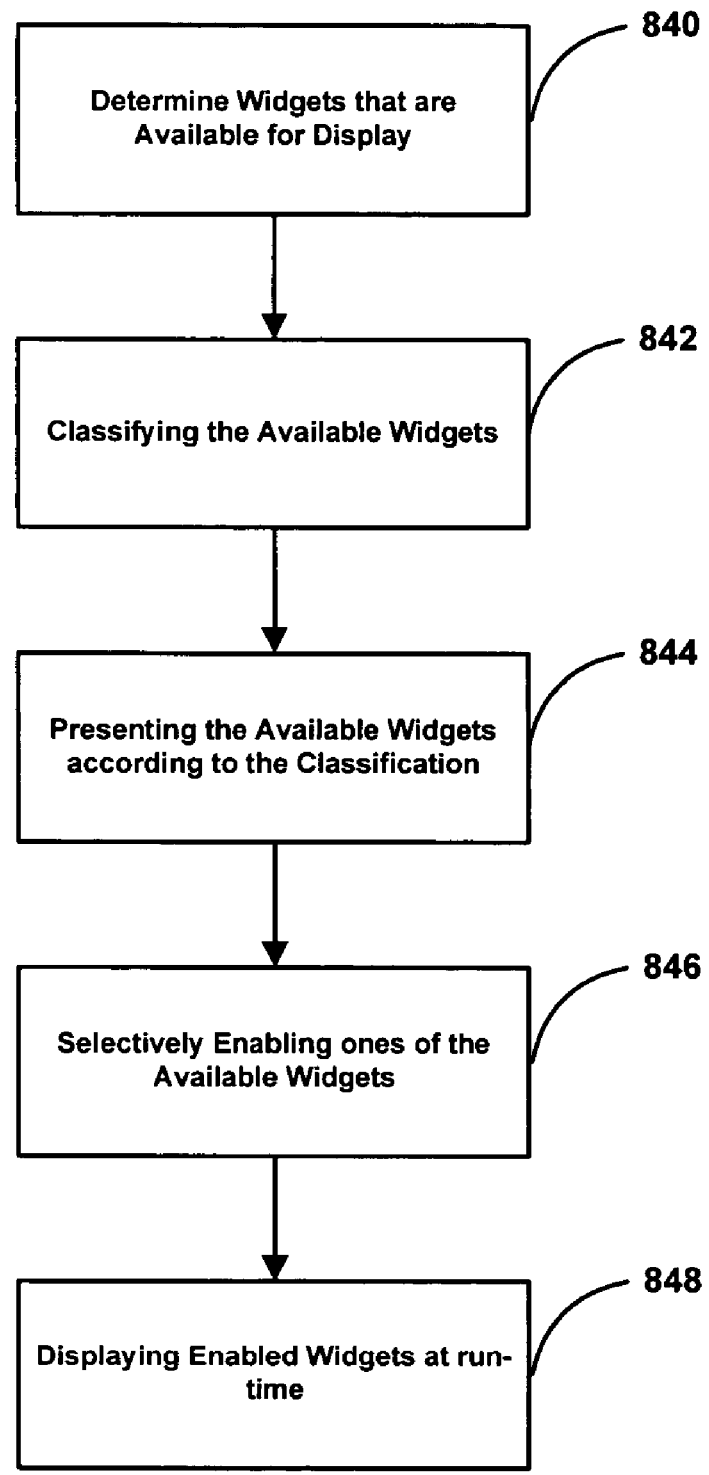
FIG. 8d shows a method for displaying widgets based on classification.

Referring to FIG. 8d, in another implementation, particular widgets for display can be determined based on classification. Classification can relate to content associated with or displayed by a given widget. Classification can also relate to type of widget in terms of functionality (e.g., webviews, or widgets able to retrieve pages from the internet). Other classification criteria are possible including classifications based on usage, popularity, preference or otherwise. Classification data can be derived by the system or be provided or otherwise associated with a given widget. A method for managing widgets based on classification can include determining widgets that are available for display 840, classifying the available widgets 842, presenting the available widgets according to the classification 844, selectively enabling ones of the available widgets 846, and, at run time, displaying enabled widgets in a display environment 848.

Classifying the available widgets can include sorting the available widgets in accordance with criteria. The criteria can be based on usage of the available widgets or type of widget. Methods associated with criteria selection are discussed below.

In another implementation, a method for managing widgets includes identifying available widgets for display in a display environment, determining criteria for selecting ones of the available widgets and displaying the selected ones of the available widgets. The criteria can be a random selection or based on usage data associated with the available widgets or be defined by the user.

Figure 8E:
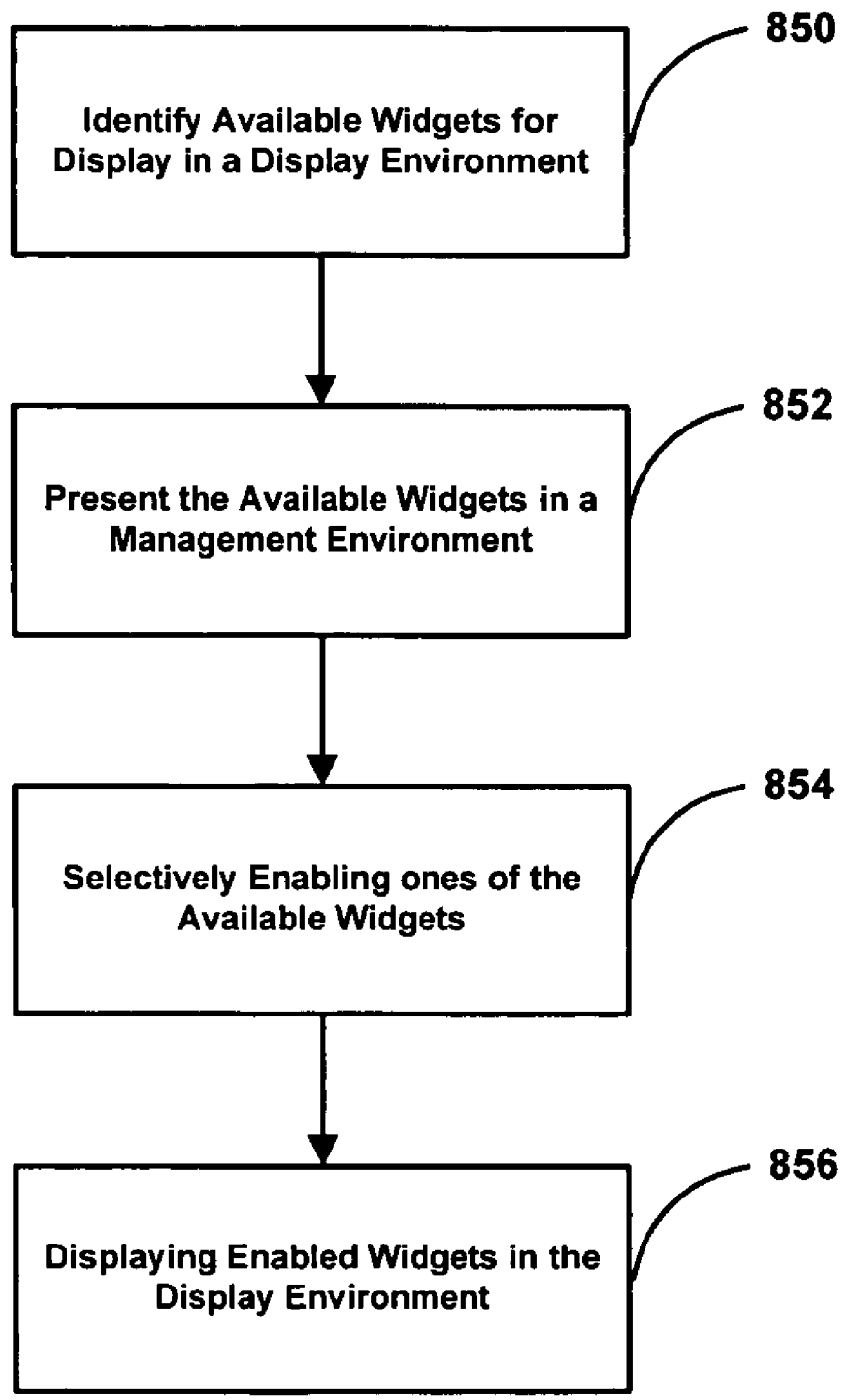
FIG. 8e shows an alternative method for managing widgets.

Widget Management in a Dedicated Management Environment Including Geometry Presentation As discussed above, the management of widgets can be accomplished as a separate process, or within the confines of another process, such as an installer process. In a management environment, administrative and user roles can be provided. Further, in a management environment, customized management tools can be provided to assist either the administrator or the user in the deployment and maintenance of widgets in a given display environment. One example of a custom tool is a geometry tool. A geometry tool can be used to organize the presentation of widgets in the display environment. The geometry tool can have associated display geometry that defines how widgets are to be displayed. The display geometry can include patterns or the like for defining the presentation of enabled widgets in the display environment. Examples include a clock pattern, a square pattern, a three dimensional cube or other patterns. As such, a separate process that focuses just on the management functionalities can be beneficial. In the implementation shown in FIG. 8e, a method of managing widgets includes identifying available widgets for display in a display environment 850, presenting the available widgets in a management environment 852, selectively enabling ones of the available widgets 854, and displaying enabled widgets in the display environment 856.

Displaying enabled widgets can include controlling placement of each widget in the display environment in accordance with a display geometry. The display geometry can define a location for each widget in the display environment. The method can include identifying a new widget for installation, installing the new widget including previewing the new widget in a location in the display environment defined by the display geometry, and selectively installing the new widget after the preview including adding the new widget in the presentation of the available widgets.

In the above description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

In particular, one skilled in the art will recognize that other architectures and graphics environments may be used, and that the present invention can be implemented using graphics tools and products other than those described above. In particular, the client/server approach is merely one example of an architecture for providing the dashboard functionality of the present invention; one skilled in the art will recognize that other, non-client/server approaches can also be used.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and modules presented herein are not inherently related to any particular computer or other apparatus. Various general-purpose systems may be used with programs in accordance with the teachings herein, or it may prove convenient to construct more specialized apparatuses to perform the method steps. The required structure for a variety of these systems will appear from the description below. In addition, the present invention is not described with reference to any particular programming language. It will be appreciated that a variety of programming languages may be used to implement the teachings of the invention as described herein. Furthermore, as will be apparent to one of ordinary skill in the relevant art, the modules, features, attributes, methodologies, and other aspects of the invention can be implemented as software, hardware, firmware or any combination of the three. Of course, wherever a component of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of skill in the art of computer programming. Additionally, the present invention is in no way limited to implementation in any specific operating system or environment.

It will be understood by those skilled in the relevant art that the above-described implementations are merely exemplary, and many changes can be made without departing from the true spirit and scope of the present invention. Therefore, it is intended by the appended claims to cover all such changes and modifications that come within the true spirit and scope of this invention.

What is claimed is:

1. A widget manager comprising:
   a management engine operable to present available widgets in a palette of a user interface display environment; selectively enable or disable each of the available widgets; and
   display enabled widgets in the display environment, where an enabled widget presently executes an associated function including providing a presentation aspect associated with the executing function, and where selectively enabling or disabling includes selecting a widget for enabling or disabling based on statistics for usage of a given widget by one or more users and criteria for evaluating the statistics,
   wherein the statistics for usage including statistics for how often over a time period the given widget was enabled by the one or more users and when the respective widget was last enabled and wherein the usage criteria include information on how often the usage information is to be evaluated.

2. The widget manager of claim 1, wherein the management engine is further operable to locate widgets for installation in the display environment.

3. The widget manager of claim 1, wherein the management engine is further operable to install widgets into the display environment.

4. The widget manager of claim 3, wherein installing widgets includes previewing widgets in the display environment.

5. The widget manager of claim 1, wherein the display environment is a user interface of an electronic device.

6. A method of managing widgets for display in a display environment, comprising:
   determining usage information for widgets when displayed in a display environment, the usage information including statistics for usage by one or more users of each respective widget, the statistics for usage including statistics for how often over a time period the respective widget was enabled by the one or more users and when the respective widget was last enabled;

determining usage criteria associated with the presentation of widgets in the display environment, the usage criteria defining how to evaluate the usage information in order to make a selection of one or more of the widgets for presentation in the display environment, the usage criteria include information on how often the usage information is to be evaluated;

selectively enabling at least one widget from available widgets based on the usage criteria and the usage information; and displaying enabled widgets in the display environment.

7. The method of claim 6, wherein determining usage information includes determining usage information for more than one user.

8. The method of claim 6, wherein activation includes user interaction with the widget.

9. A method for managing widgets, comprising:

identifying available widgets for display in a display environment;

determining criteria for selecting ones of the available widgets, the criteria defining which widgets to select based on usage statistics of the widgets by one or more users, the usage statistics related to display of the widgets previously in a display environment and including statistics for how often over a time period a respective widget was displayed by the one or more users;

determining how often to evaluate the criteria including determining a time period;

after expiration of a time period, displaying and enabling selected ones of the available widgets, where an enabled widget presently executes an associated function including providing a presentation aspect associated with the executing function.

10. The method of claim 9, wherein the criteria is a random selection.

11. The method of claim 9, wherein the criteria are based on usage data associated with the available widgets.

12. The method of claim 9, wherein the criteria are defined by the user.

13. A computer-readable storage medium having stored thereon instructions which, when executed by a processor, causes the processor to perform the operations of:

determining usage information for widgets when displayed in a display environment the usage information including statistics for usage by one or more users of each respective widget related to display of the widgets previously in a display environment and including statistics for how often over a time period a respective widget was displayed by the one or more users and when the respective widget was last displayed;

determining usage criteria associated with the presentation of widgets in the display environment, the usage criteria defining how to evaluate the usage information in order to make a selection of one or more of the widgets for presentation in the display environment, the usage criteria include information on how often the usage information is to be evaluated;

selectively enabling at least one widget from available widgets based on the usage criteria and the usage information; and displaying enabled widgets in the display environment.

14. A computer-readable storage medium having stored thereon instructions which, when executed by a processor, causes the processor to perform the operations of:

identifying available widgets for display in a display environment;

determining information and criteria for selecting ones of the available widgets, the information defining which widgets to select based on usage statistics associated with the widgets, the usage statistics related to display of the widgets previously in a display environment by one or more users and including statistics for how often over a time period a respective widget was displayed by the one or more users and when the respective widget was last displayed, the criteria defining how to evaluate the information in order to make a selection of one or more of the widgets for presentation in the display environment, the criteria defining how often the information is to be evaluated;

displaying and enabling selected ones of the available widgets, where an enabled widget presently executes an associated function including providing a presentation aspect associated with the executing function.

* * * * *

UNITED STATES PATENT AND TRADEMARK OFFICE
CERTIFICATE OF CORRECTION

PATENT NO.        : 7,707,514 B2                          Page 1 of 1
APPLICATION NO.   : 11/429492
DATED             : April 27, 2010
INVENTOR(S)       : Scott Forstall et al.

It is certified that error appears in the above-identified patent and that said Letters Patent is hereby corrected as shown below:

On page 4, in column 1, under "Other Publications", line 58, after "pages." insert -- Jan. 27, 2006 --.

On page 4, in column 1, under "Other Publications", line 60, after "date" delete "unknown" and insert -- Apr. 17, 2003 --, therefor.

On page 4, in column 2, under "Other Publications", line 22, after "pages." insert -- Jul. 19, 1996 --.

On page 5, in column 2, under "Other Publications", line 7, delete "Informration" and insert -- Information --, therefor.

On page 5, in column 2, under "Other Publications", line 20, delete "Retreived" and insert -- Retrieved --, therefor.

On Sheet 12 of 28, in Figure 6, in Box Number 602, line 1, delete "Indentifying" and insert -- Identifying --, therefor.

In column 28, line 2, in Claim 13, delete "environment" and insert -- environment, --, therefor.

Signed and Sealed this
Eighth Day of November, 2011

David J. Kappos
*Director of the United States Patent and Trademark Office*